US011851817B2

(12) United States Patent
Omagari

(10) Patent No.: US 11,851,817 B2
(45) Date of Patent: Dec. 26, 2023

(54) DEFIBRATING APPARATUS AND FIBER BODY MANUFACTURING APPARATUS

(71) Applicant: SEIKO EPSON CORPORATION, Tokyo (JP)

(72) Inventor: Naoko Omagari, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/814,847

(22) Filed: Jul. 26, 2022

(65) Prior Publication Data

US 2023/0034767 A1 Feb. 2, 2023

(30) Foreign Application Priority Data

Jul. 28, 2021 (JP) ................................ 2021-123136

(51) Int. Cl.

*D21F 9/04* (2006.01)
*D21B 1/32* (2006.01)
*D21B 1/06* (2006.01)

(52) U.S. Cl.

CPC ............... *D21F 9/04* (2013.01); *D21B 1/061* (2013.01); *D21B 1/32* (2013.01)

(58) Field of Classification Search

CPC ........... D21F 9/04; B27N 3/04; B02C 18/062; B02C 18/06; D21B 1/06; D21B 1/063; D21B 1/08

See application file for complete search history.

(56) References Cited

U.S. PATENT DOCUMENTS

2020/0299897 A1* 9/2020 Yamasaki .............. D21B 1/061

FOREIGN PATENT DOCUMENTS

JP 2020-158944 A 10/2020
JP 2020158944 A * 10/2020 ............ D04H 1/732

* cited by examiner

*Primary Examiner* — Eric Hug
*Assistant Examiner* — Matthew M Eslami
(74) *Attorney, Agent, or Firm* — Global IP Counselors, LLP

(57) ABSTRACT

A defibrating apparatus includes a screen and housings, and side walls of the housings have inner surfaces that define the inner surface of a discharge path. Let communication hole be any through-hole that interconnects the defibrating chamber and the discharge path, and let discharge path-side opening edge be the opening edge, close to the discharge path, of the through-hole, then the screen has through-hole rows, each of which is formed by a plurality of communication holes arranged at an interval in a circumferential direction, and the through-hole row is provided at a position where the discharge path-side opening edge of the communication holes is overlapped with the inner surface as seen in a radial direction.

6 Claims, 20 Drawing Sheets

DEFIBRATING APPARATUS AND FIBER BODY MANUFACTURING APPARATUS

The present application is based on, and claims priority from JP Application Serial Number 2021-123136, filed Jul. 28, 2021, the disclosure of which is hereby incorporated by reference herein in its entirety.

BACKGROUND

1. Technical Field

The present disclosure relates to a defibrating apparatus, and a fiber body manufacturing apparatus.

2. Related Art

JP-A-2020-158944 discloses a defibrating apparatus that discharges a defibrated material formed from a raw material through a discharge path extending along the outside of an annular wall which defines a defibrating chamber, and through a discharge pipe communicating with the discharge path, by rotating a rotational body stored in the defibrating chamber. In the defibrating apparatus, the discharge path and the defibrating chamber communicate with each other by a plurality of through-holes provided in the annular wall of the defibrating chamber. The defibrated material formed in the defibrating chamber passes through the through-holes by an air flow, and is discharged to the discharge path.

However, in the defibrating apparatus described in JP-A-2020-158944, a defibrated material discharged to the discharge path may stagnate on the inner surface of the discharge path.

SUMMARY

A defibrating apparatus includes: a rotational body rotatable around a center at an axis of a rotational shaft; a defibrating chamber that stores the rotational body which when rotated, causes a defibrated material to be formed from a raw material containing fibers; a discharge path that communicates with the defibrating chamber, and receives the defibrated material discharged from the defibrating chamber; a circular annular wall that is provided at an interval from the rotational body in a radial direction of the rotational body, and that defines the defibrating chamber; a housing that forms the discharge path; and a plurality of through-holes provided in the annular wall, the plurality of through-holes penetrating the annular wall in the radial direction. The discharge path has a width in an axial direction along the axis, and extends in a circumferential direction of the annular wall, the housing has a side wall extending in the circumferential direction, and the side wall has an inner surface that defines the discharge path, let a communication hole be any of the through-holes which interconnect the defibrating chamber and the discharge path, and let a discharge path-side opening edge be any of opening edges, close to the discharge path, of the through-holes, then the annular wall has a communication hole group which is formed by a plurality of communication holes, each of which is the communication hole, which are arranged at intervals in the circumferential direction, and the communication hole group is provided at a position where the discharge path-side opening edge of the communication hole is overlapped with the inner surface as seen in the radial direction.

A fiber body manufacturing apparatus includes: the defibrating apparatus described above; a web former that forms a web by accumulating the defibrated material discharged from the defibrating apparatus; and a fiber body former that forms a fiber body including fibers by binding the fibers contained in the web.

DESCRIPTION OF EXEMPLARY EMBODIMENTS

Figure 1:
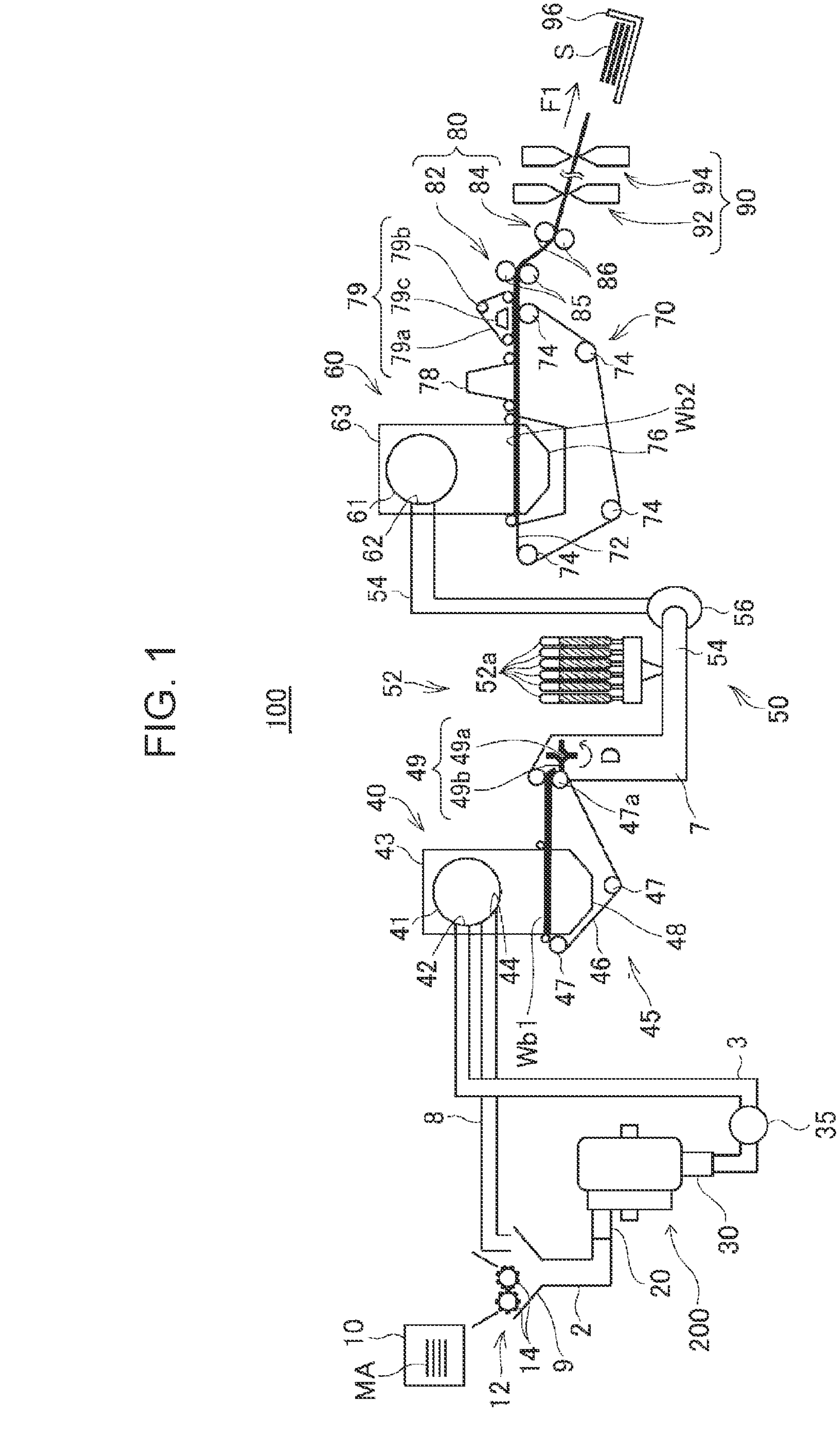
FIG. 1 is a schematic diagram illustrating the configuration of a sheet manufacturing apparatus as an embodiment of the present disclosure.
Figure 2:
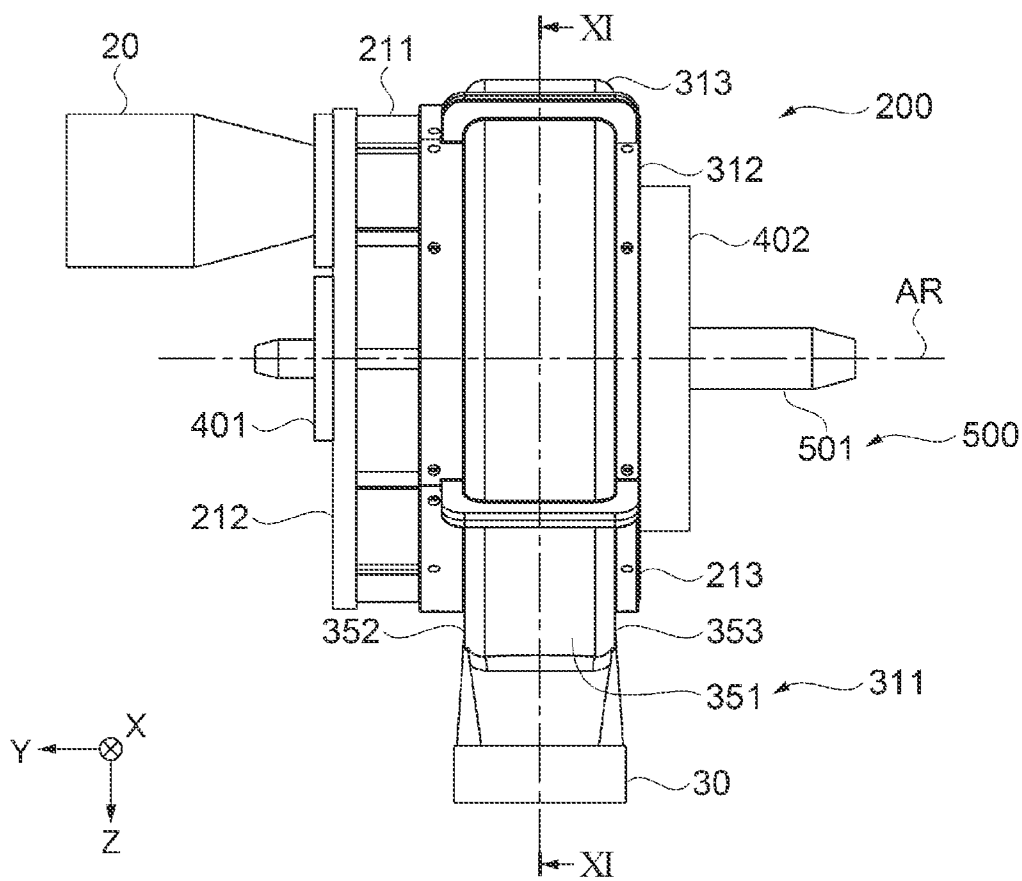
FIG. 2 is a side view as seen from −X direction side of the defibrating apparatus as an embodiment of the present disclosure.
Figure 3:
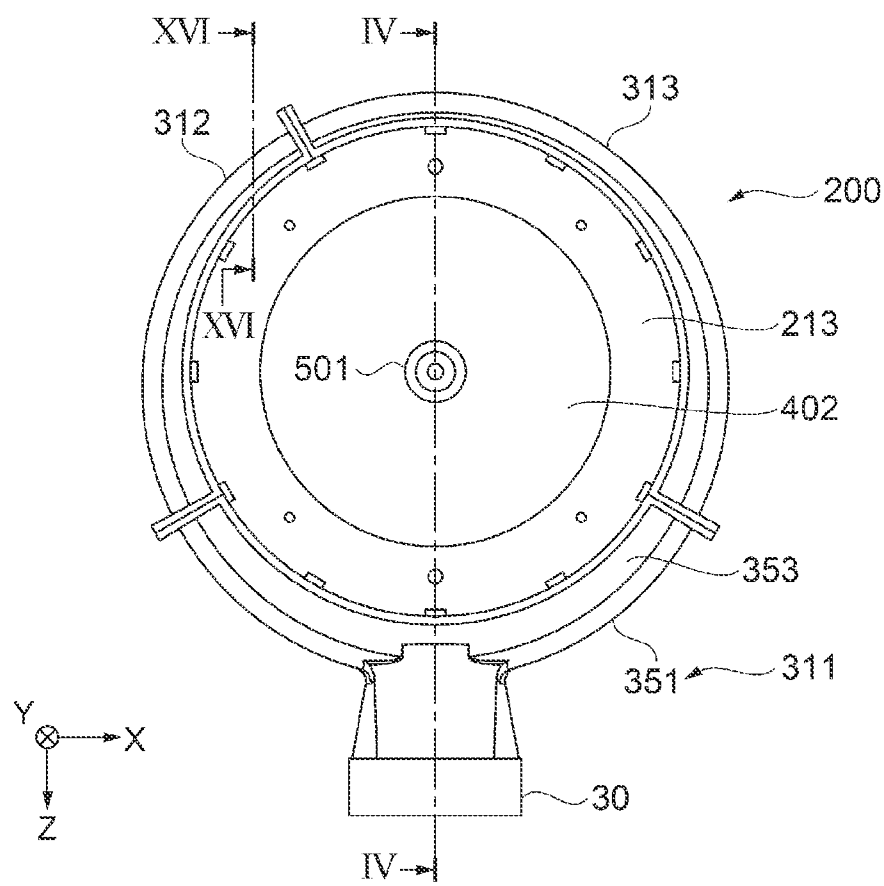
FIG. 3 is a side view as seen from −Y direction side of the defibrating apparatus.

The present disclosure will be described based on the embodiment below. In each of the drawings, the same members are labeled with the same symbol, and a redundant description is omitted. Note that in the present specification, “the same” refers to not only completely the same, but also the same in consideration of measurement error, the same in consideration of manufacturing variation in members, and the same in a range where functions are not impaired. Thus, for instance, “both sizes are the same” indicates that in consideration of measurement error, and manufacturing variation in members, the difference in both sizes is within ±10% of one of the sizes, more preferably, within ±5% of one of the sizes, and further more preferably, within ±3% of one of the sizes.

In addition, in each drawing, X, Y, Z represent three space axes perpendicular to each other. In the present specification, the directions along these axes are called X-axis direction, Y-axis direction and Z-axis direction. When a direction is specified, let "+" indicate the positive direction and "−" indicate the negative direction, and the symbols of positive and negative are both used for direction notation. A description is given where in the drawings, + direction indicates the direction of each arrow and − direction indicates the opposite direction of each arrow. The Z-axis direction indicates the gravity direction, the +Z direction indicates the vertically downward direction, and the −Z direction indicates the vertically upward direction. A description is given where X-Y plane denotes the plane including the X-axis, the Y-axis, X-Z plane denotes the plane including the X-axis, the Z-axis, and Y-Z plane denotes the plane including the Y-axis, the Z-axis. The X-Y plane is a horizontal plane. In addition, a description is given where X-axis, Y-axis, Z-axis are three space axes of X, Y, Z with their positive direction or negative direction not specified.

1. Embodiment 1

The configuration of a sheet manufacturing apparatus 100 according to Embodiment 1 will be described. The sheet manufacturing apparatus 100 fiberizes a raw material MA containing fibers, and recycles the material into a new sheet S. The sheet manufacturing apparatus 100 is an example of a fiber body manufacturing apparatus. In addition, the sheet S is an example of a fiber body.

As illustrated in FIG. 1, the sheet manufacturing apparatus 100 includes a storage supplier 10, a crusher 12, a defibrating apparatus 200, a selector 40, a first web former 45, a rotational body 49, a mixer 50, an accumulation section 60, a second web former 70, a transporter 79, a sheet former 80, and a cutter 90.

The storage supplier 10 is an automatic injection apparatus that stores the raw material MA, and continuously injects the raw material MA into the crusher 12. The raw material MA should include fibers, and is, for instance, used paper, waste paper, or pulp sheet.

The crusher 12 includes a crushing blade 14 that cuts the raw material MA supplied by the storage supplier 10, and the crusher 12 cuts the raw material MA in the air into fragments measuring several square centimeters by the crushing blade 14. For instance, a shredder can be used as the crusher 12. The raw material MA cut by the crusher 12 is collected by a hopper 9, and transported to a supply pipe 20 of the defibrating apparatus 200 through a pipe 2.

Crushed fragments are transported from the crusher 12 to the defibrating apparatus 200 by air flow. In the defibrating apparatus 200, the crushed fragments are transported from the supply pipe 20 to the later-described defibrating chamber 210, and the crushed fragments are defibrated by rotation of a rotational body 500 stored in the defibrating chamber 210.

A pipe 3 coupled to a discharge pipe 30 is provided with a suction unit 35. The suction unit 35 includes a blower that can apply a negative pressure to the discharge pipe 30 by sucking the air close to the discharge pipe 30 in the pipe 3. A defibrated material in the defibrating chamber 210 is discharged from the defibrating apparatus 200 through the later-described discharge path 310 and the discharge pipe 30 by air flow generated by the negative pressure applied to the discharge pipe 30. The defibrated material discharged from the defibrating apparatus 200 is transferred to the selector 40 through the pipe 3 coupled to the discharge pipe 30. The configuration of the defibrating apparatus 200 will be described below.

The selector 40 sorts the components contained in the defibrated material by size of fiber. The selector 40 has a drum unit 41, and a storage 43 that stores the drum unit 41. The drum unit 41 uses a sieve, for instance.

The defibrated material introduced into the drum unit 41 through an introduction port 42 is sorted by rotation of the drum unit 41 into a passing material which has passed through an opening of the drum unit 41, and a remaining material which has not passed through the opening. A first sorted material, which is a passing material which has passed through the opening, moves down in the storage 43 to the first web former 45.

In addition, a second sorted material, which is a remaining material which has not passed through the opening, is re-send from a discharge port 44 to the supply pipe 20 of the defibrating apparatus 200 through pipes 8, 2, the discharge port 44 communicating with the inside of the drum unit 41.

The first web former 45 includes a mesh belt 46, tension rollers 47, 47*a*, and a suction unit 48. The mesh belt 46 is an endless-shaped belt, and is stretched over the multiple tension rollers 47, 47*a*. The mesh belt 46 circumferentially moves along a path formed by the tension rollers 47, 47*a*. Part of the path of the mesh belt 46 is planar under the drum unit 41, and the mesh belt 46 forms a planar surface. The suction unit 48 corresponds to a suction mechanism.

A large number of openings are formed in the mesh belt 46. Of the first sorted material moved down from the drum unit 41 located above the mesh belt 46, those components larger than the openings of the mesh belt 46 are accumulated on the mesh belt 46. In contrast, of the first sorted material, those components smaller than the openings of the mesh belt 46 pass through the openings.

The suction unit 48 includes a blower which is not illustrated, and sucks air from the opposite side to the drum unit 41 with respect to the mesh belt 46. The components which have passed through the openings of the mesh belt 46 are sucked by the suction unit 48. The air flow sucked by the suction unit 48 has an effect of accumulating components by attracting the first sorted material moved down from the drum unit 41 to the mesh belt 46.

The components accumulated on the mesh belt 46 has a web shape, and form a first web Wb1. The basic configuration of the mesh belt 46, the tension rollers 47, 47*a* and the suction unit 48 is the same as the configuration of a mesh belt 72, a tension roller 74 and a suction mechanism 76 of the later-described second web former 70.

The first web Wb1 is transported to the rotational body 49 along with the movement of the mesh belt 46.

The rotational body 49 includes a base 49*a* coupled to a drive unit (not illustrated) such as a motor, and a projection 49*b* projecting from the base 49*a*. Rotation of the base 49*a* in direction D causes the projection 49*b* to rotate around the base 49*a*.

The rotational body 49 is located at the end, close to the tension roller 47*a*, of the planar portion of the path of the mesh belt 46. At the end, the path of the mesh belt 46 is bent downward, thus the first web Wb1 transported by the mesh belt 46 projects from the mesh belt 46, and comes into contact with the rotational body 49. The first web Wb1 is disintegrated due to collision of the projection 49*b* therewith, and turns into a mass of small fibers. The mass is transported to the mixer 50 through a pipe 7 located below the rotational body 49.

The mixer 50 mixes the first sorted material with an additive material. The mixer 50 has an additive material supply unit 52 that supplies an additive material, a pipe 54 for transporting the first sorted material and the additive material, and a mixing blower 56.

The additive material supply unit 52 supplies an additive material to a pipe 54, the additive material including fine powder or fine particles in an additive material cartridge 52*a*.

The additive material supplied by the additive material supply unit 52 contains a resin to bind multiple fibers, in other words, a binding agent. The resin contained in the additive material is melted when being passed through the sheet former 80, thereby binding multiple fibers.

The mixing blower 56 generates an air flow in the pipe 54 which couples the pipe 7 and the accumulation section 60. In addition, the first sorted material transported from the pipe 7 to the pipe 54, and the additive material supplied to the pipe 54 by the additive material supply unit 52 are mixed when being passed through the mixing blower 56.

The accumulation section 60 moves down the fibers in a mixture to the second web former 70, while disentangling and dispersing the fibers in the air.

The accumulation section 60 has a drum unit 61, an introduction port 62 for introducing a mixture to the drum unit 61, and a storage 63 that stores the drum unit 61. The drum unit 61 is a cylindrical structure which is formed in the same manner as the drum unit 41, for instance, and rotates by the power of a motor (not illustrated), and functions as a sieve in the same manner as the drum unit 41.

The second web former 70 is disposed below the drum unit 61. The second web former 70 includes, for instance, a mesh belt 72, a tension rollers 74, and a suction mechanism 76. The second web former 70 is an example of a web former.

Of the mixture moved down from the drum unit 61 located above the mesh belt 72, the components larger than the openings of the mesh belt 72 are accumulated on the mesh belt 72. The components accumulated on the mesh belt 72 has a web shape, and form a second web Wb2.

In the transportation path of the mesh belt 72, a humidity controller 78 is provided downstream of the accumulation section 60. The amount of water contained in the second web Wb2 is adjusted by the moisture supplied by the humidity controller 78, thus the effect of reducing adsorption of fibers to the mesh belt 72 due to static electricity cab be expected.

The second web Wb2 is removed from the mesh belt 72 by the transporter 79, and transported to the sheet former 80. The transporter 79 has, for instance, a mesh belt 79*a*, a roller 79*b*, and a suction mechanism 79*c*. The suction mechanism 79*c* includes a blower which is not illustrated, and generates an upward air flow via the mesh belt 79*a* by the suction force of the blower. The air flow causes the second web Wb2 to be separated from the mesh belt 72, and to be adsorbed to the mesh belt 79*a*. The mesh belt 79*a* is moved by the rotation of the roller 79*b* to transport the second web Wb2 to the sheet former 80.

The mesh belt 79*a* can be formed as an endless-shaped belt having openings in the same manner as the mesh belt 46 and the mesh belt 72.

The sheet former 80 binds the fibers from the first sorted material contained in the second web Wb2 and the resin contained in the additive material by applying heat to the second web Wb2.

The sheet former 80 includes a pressure unit 82 that pressurizes the second web Wb2, and a heater 84 that heats the second web Wb2 pressurized by the pressure unit 82. The pressure unit 82 pressurizes the second web Wb2 with a predetermined nip pressure by a pair of calendar rollers 85, and transports the second web Wb2 to the heater 84. The heater 84 catches the densified second web Wb2 by a pair of heating rollers 86 to apply heat to the second web Wb2, and transports it to the cutter 90. In the heater 84, the resin contained in the second web Wb2 is heated, and turned into a sheet S. The sheet former 80 is an example of a fiber body former.

The cutter 90 cuts the sheet S formed by the sheet former 80. The cutter 90 has a first cutter 92 that cuts the sheet S in a direction crossing a transport direction F1 of the sheet S indicated by a symbol F1 in FIG. 1, and a second cutter 94 that cuts the sheet S in a direction parallel to the transport direction F1. The cutter 90 cuts the length and the width of the sheet S with a predetermined size to form single sheets S. The sheet S cut by the cutter 90 is stored in the discharge section 96.

Next, the configuration of the defibrating apparatus 200 will be described. The defibrating apparatus 200 is an apparatus that performs a process of disintegrating the raw material MA in a state of multiple fibers bonded to one or a small number of fibers. The defibrating apparatus 200 is a dry defibrating apparatus that performs a process of defibration in a gas such as atmosphere, air, and not in liquid.

As illustrated in FIGS. 2 to 5, the defibrating apparatus 200 includes the rotational body 500, the defibrating chamber 210, the supply pipe 20, the discharge path 310, and the discharge pipe 30. The defibrating apparatus 200 forms a defibrated material from the raw material MA supplied through the supply pipe 20 by rotating the rotational body 500 stored in the defibrating chamber 210, around an axis AR of a rotational shaft 501. The defibrating apparatus 200 includes a screen 221, a fixing member 211, and side walls 212, 213 that define the defibrating chamber 210; housings 311, 312, 313 that define the discharge path 310; supporting units 401, 402 that support the rotational body 500; and a blocking member 601. In the description below, the rotational direction in which the rotational shaft 501 rotates around the axis AR, and the radial direction of the rotational shaft 501 may be called a circumferential direction CR, and a radial direction RR, respectively.

The rotational body 500 has the rotational shaft 501, a base 502, rotary blades 503, and rotary vanes 504. The rotational body 500 is stored in the defibrating chamber 210 so that the axis AR of the rotational shaft 501 is along the Y-axis. Thus, the rotational shaft 501 extends in the Y-axis direction. The Y-axis direction is an example of an axial direction. In other words, the defibrating apparatus 200 is disposed in the sheet manufacturing apparatus 100 in a posture in which the axis AR is horizontal. The base 502 has a circular plate shape, and is inserted in the rotational shaft 501 and fixed. The rotary blades 503 are provided to project in a direction away from the base 502 in the radial direction RR. The rotary blades 503 have a plate-like projection shape. The multiple rotary blades 503 are formed at intervals in the circumferential direction CR.

Figure 5:
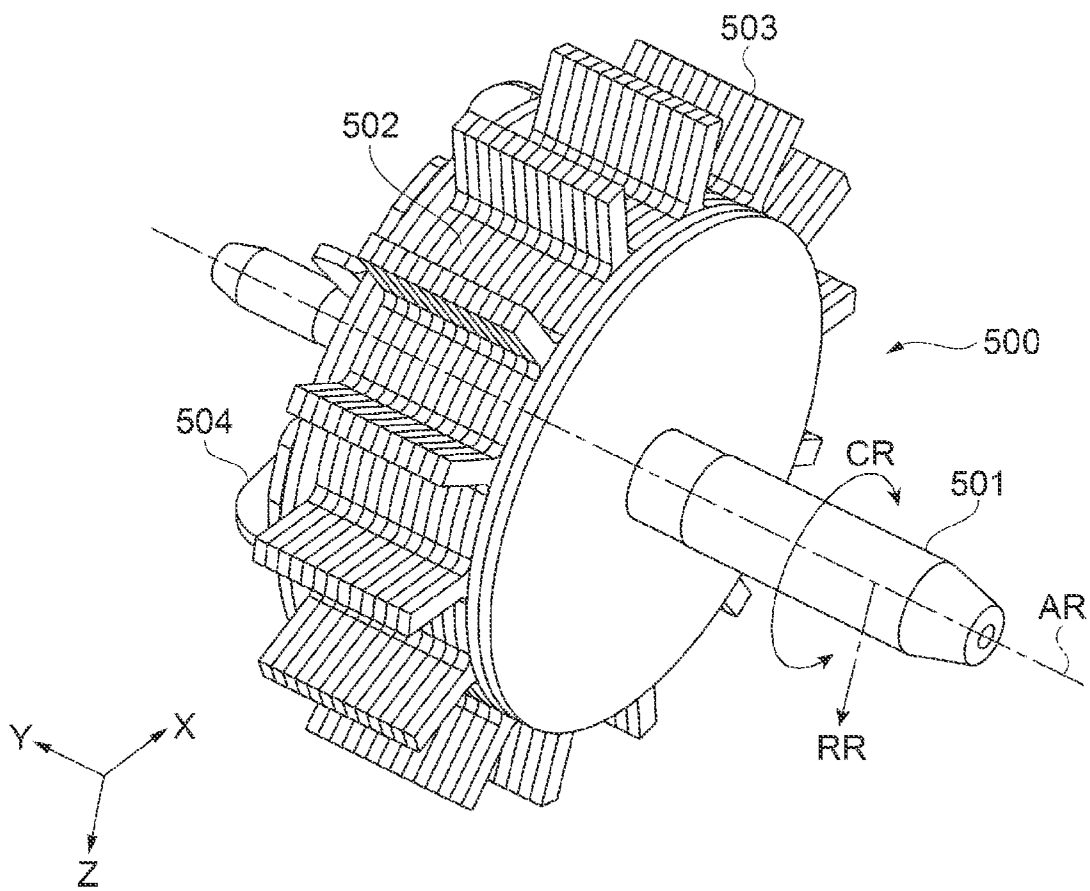
FIG. 5 is a perspective view illustrating a rotational body.

The multiple rotary vanes 504 are provided on +Y direction side of the base 502 at intervals in the circumferential direction CR. As illustrated in FIG. 5, in the embodiment, the rotary blades 503 and the base 502 are formed by stacking thin laminated plates in the Y-axis direction; however, the rotary blades 503 and the base 502 may be formed as a block in an integrated shape.

Figure 4:
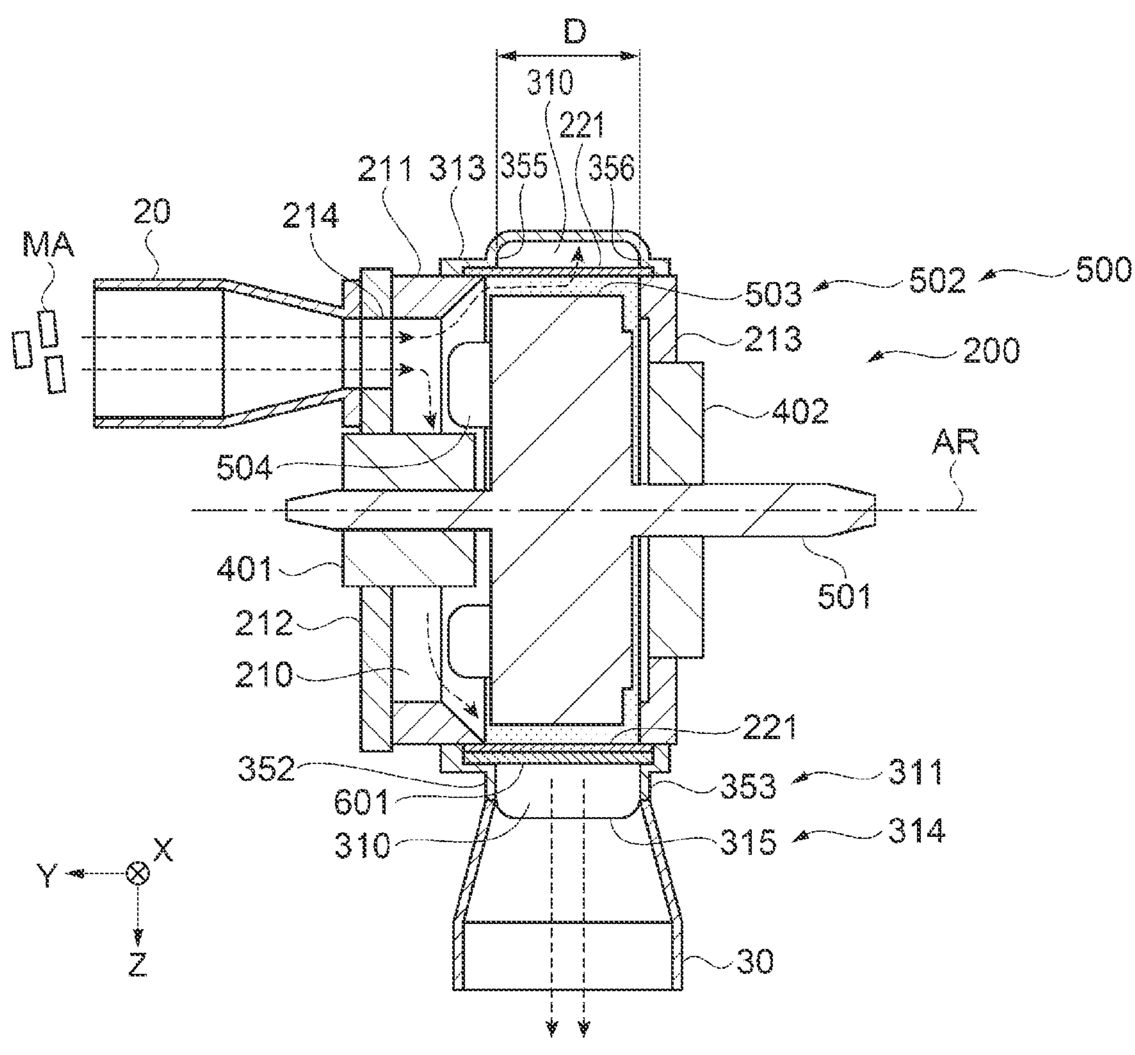
FIG. 4 is a cross-sectional view illustrating a cross section along IV-IV illustrated in FIG. 3.
Figure 6:
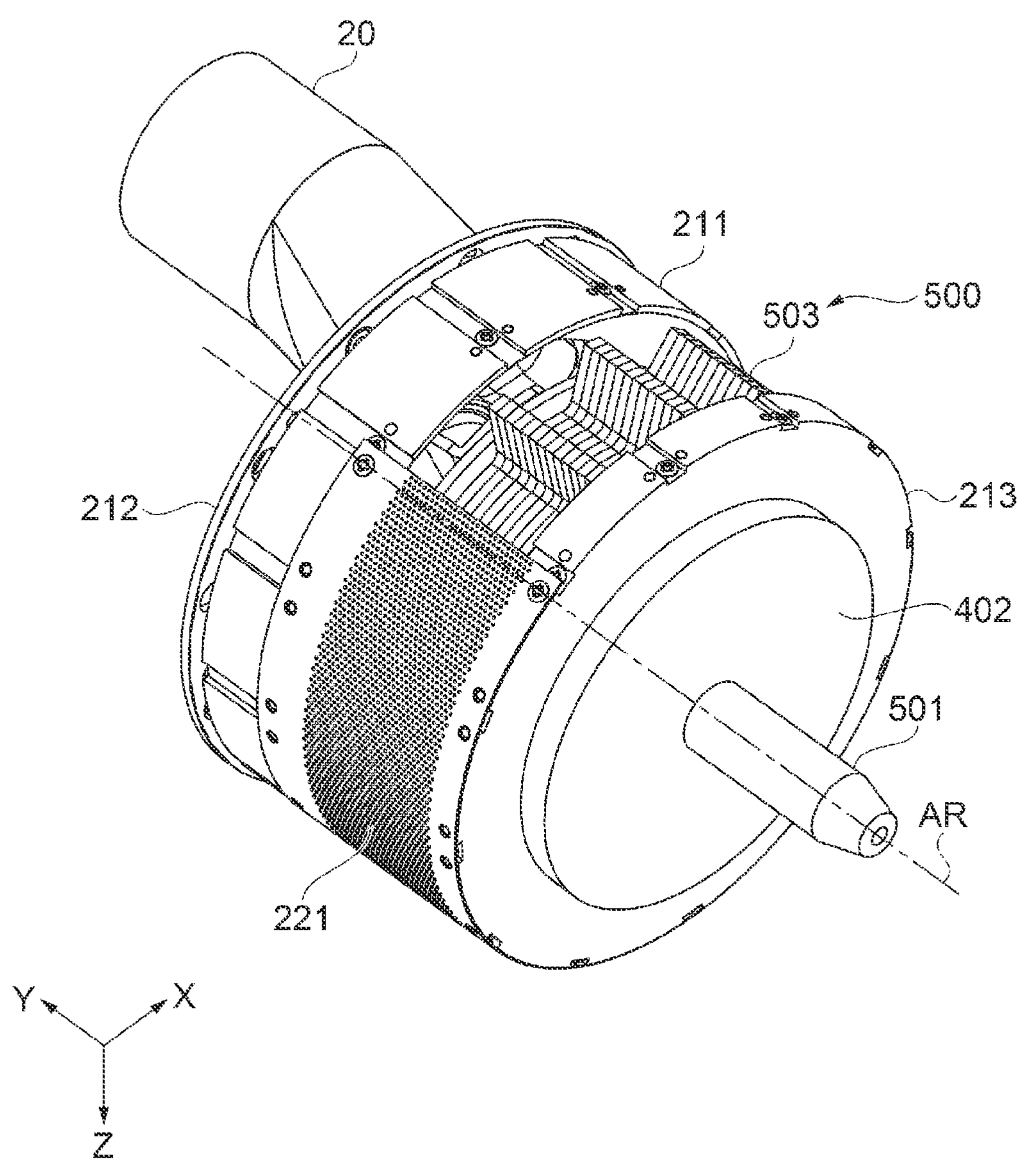
FIG. 6 is a perspective view illustrating a defibrating chamber with its screen partially removed.
Figure 7:
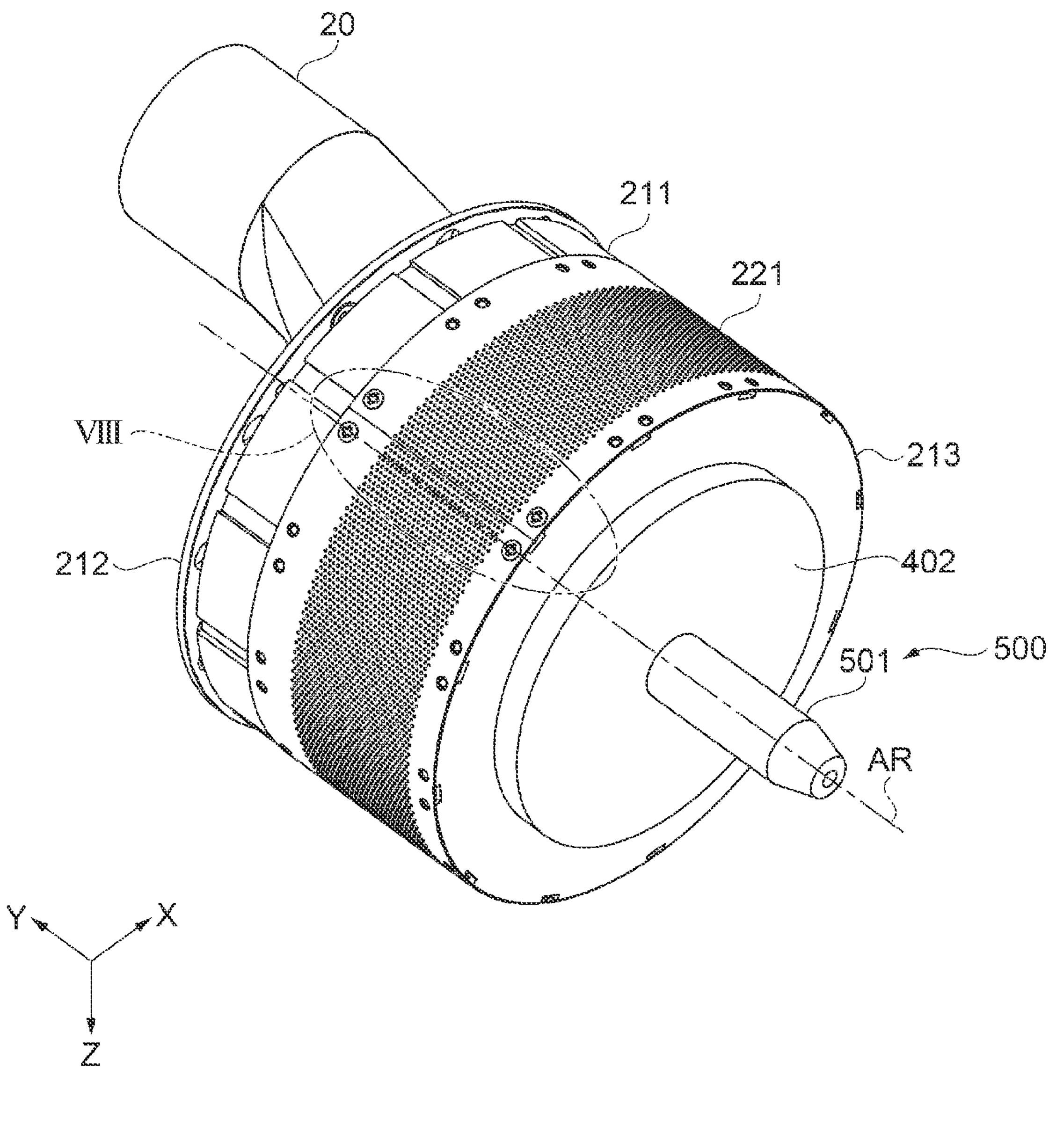
FIG. 7 is a perspective view illustrating the defibrating chamber.

As illustrated in FIG. 4, FIG. 6, the fixing member 211 has a cylindrical shape. The fixing member 211 is located on the +Y direction side of the rotary blades 503 in the Y-axis direction.

Figure 10:
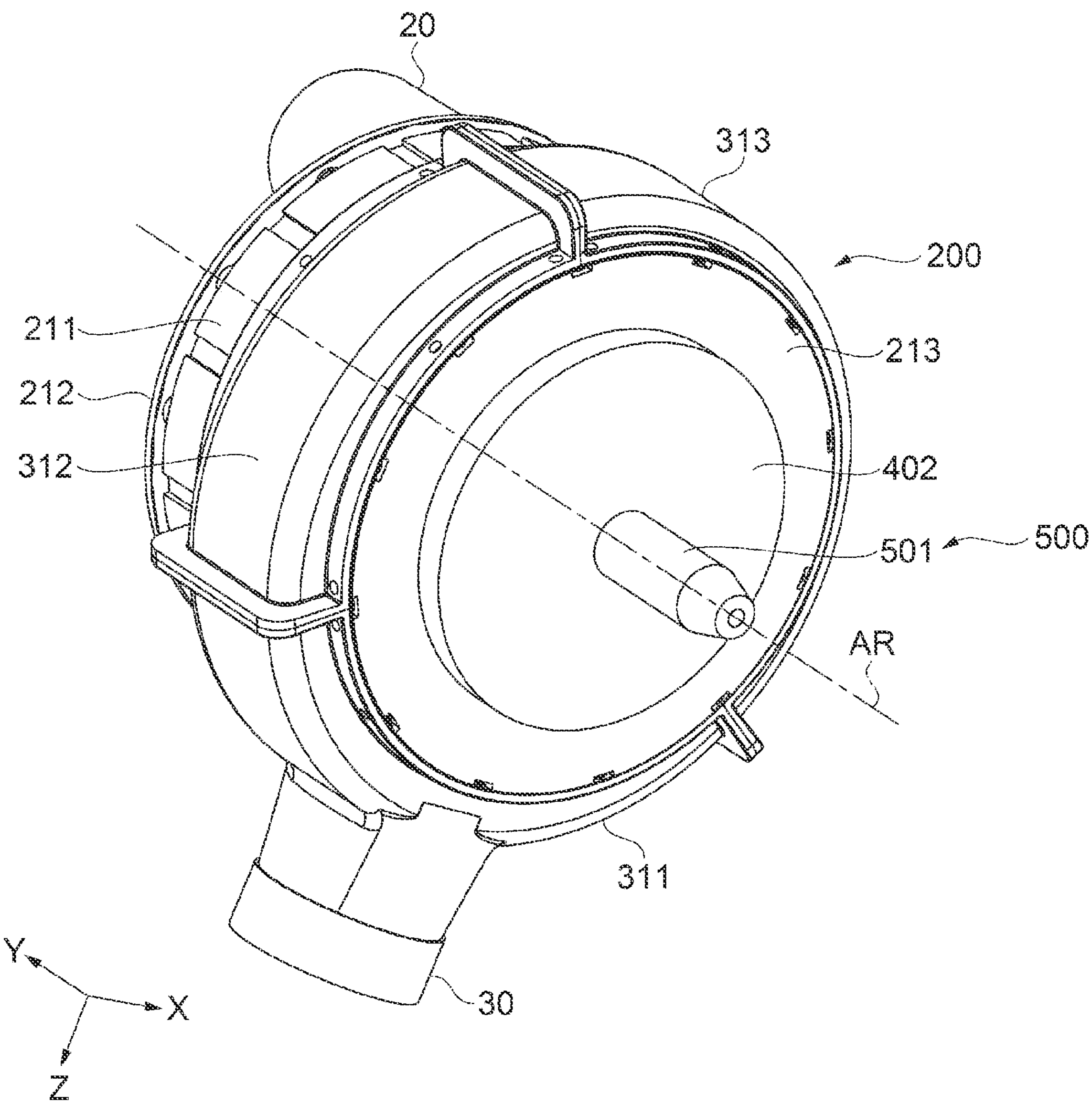
FIG. 10 is a perspective view illustrating the defibrating apparatus.
Figure 12:
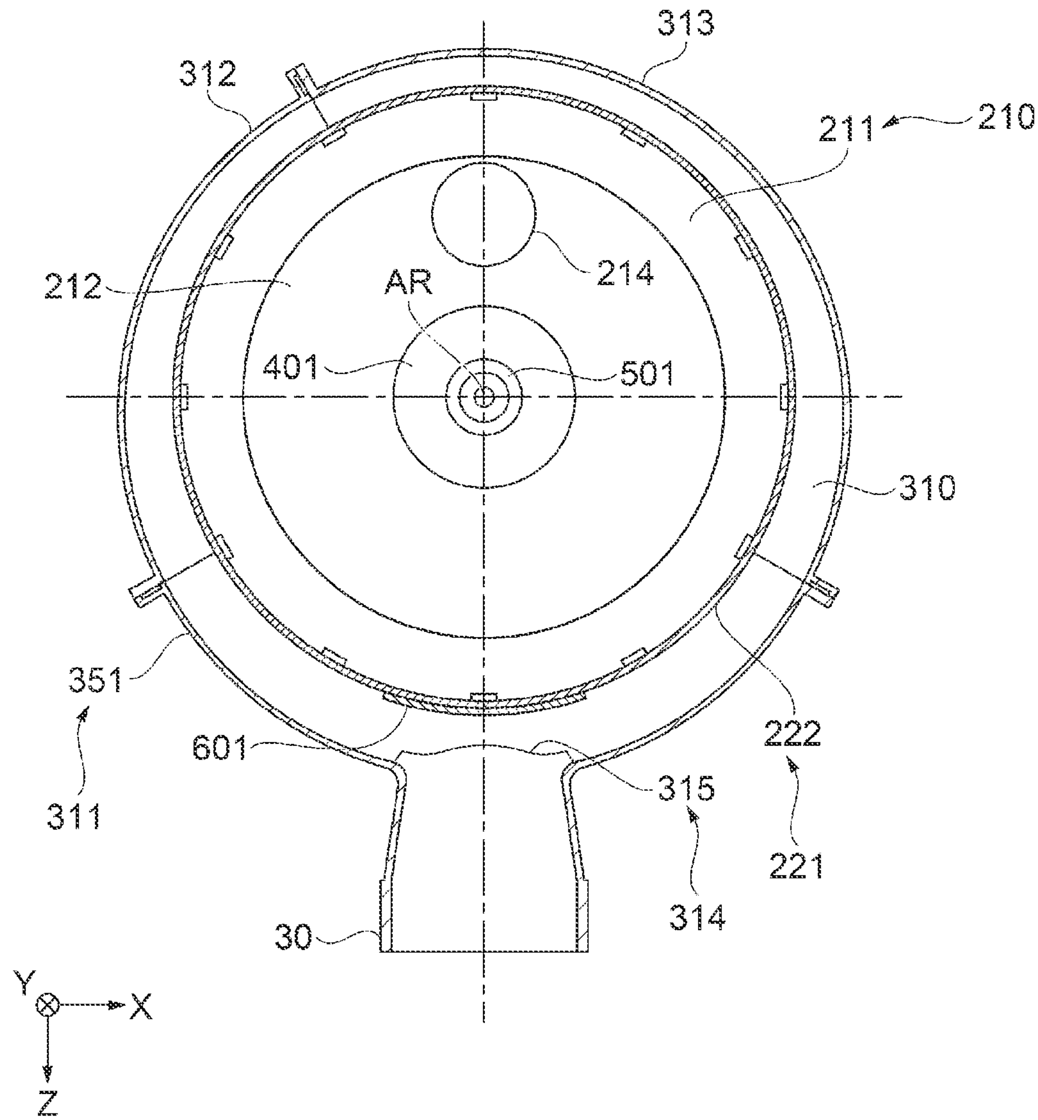
FIG. 12 is a cross-sectional view illustrating a state in which the rotational body removed from FIG. 11.
Figure 13:
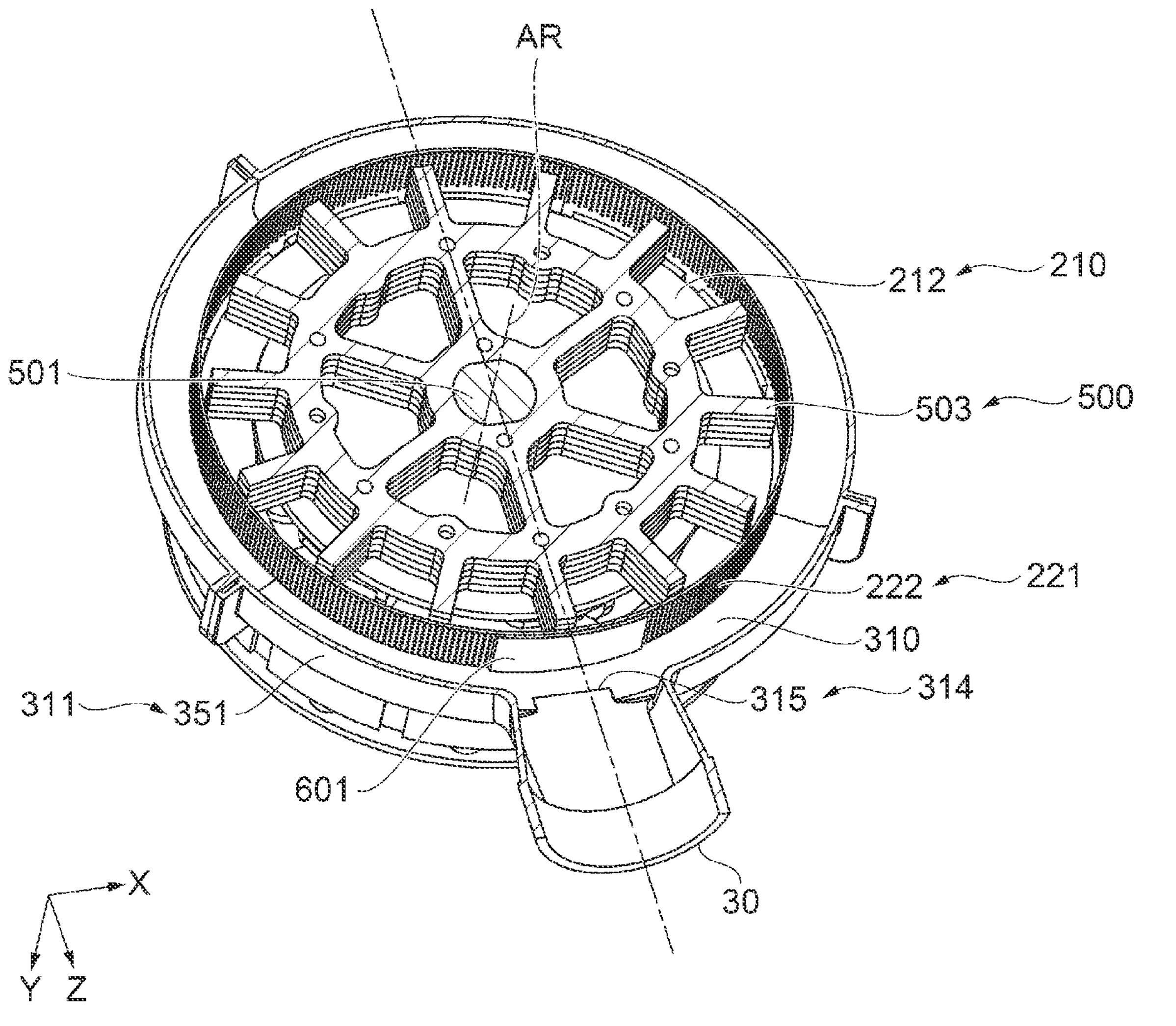
FIG. 13 is a cross-sectional perspective view illustrating the vicinity of a discharge section.

As illustrated in FIG. 4, FIG. 10, FIG. 12, the side wall 212 has a circular plate shape. The side wall 212 is located on the +Y direction side of the fixing member 211. The side wall 212 defines the inner surface of the defibrating chamber 210 on the +Y direction side by being fixed to the fixing member 211. The side wall 212 is provided with the supporting unit 401, the supply pipe 20, and a supply unit 214.

The supporting unit 401 is located at the center of the side wall 212. The supporting unit 401 is located on the +Y direction side of the rotary blades 503 of the rotational body 500. The supporting unit 401 supports the rotational shaft 501 of the rotational body 500 so that the rotational body 500 is rotatable around the axis AR as the rotation center. The supporting unit 401 supports +Y direction side of the rotary blades 503 of the rotational shaft 501 of the rotational body 500.

The rotational shaft 501 is rotationally driven by a drive mechanism which is not illustrated. In the embodiment, the drive mechanism is comprised of a belt and pulleys, power is transmitted from a rotary drive source (not illustrated) to the belt and the pulleys, and the rotational body 500 is rotated around the axis AR as the rotation center. In the embodiment, the rotational body 500 is rotated counterclockwise around the axis AR as the rotation center in FIG. 11; however, the rotational body 500 may be rotated clockwise. Alternatively, in FIG. 11, the rotational body 500 may be rotated in both clockwise and counterclockwise directions around the axis AR as the rotation center. In addition, the configuration in which the rotational shaft 501 is rotationally driven may not be the configuration based on a belt and pulleys.

The supply pipe 20 supplies the raw material MA containing fibers to the defibrating chamber 210. As illustrated in FIG. 4, FIG. 6, FIG. 12, the supply pipe 20 has a pipe shape. The supply pipe 20 is provided on the surface of the side wall 212 on +Y direction side. The supply pipe 20 is provided at a position in −Z direction from the axis AR of the rotational shaft 501 in the side wall 212. The supply pipe 20 extends in the Y-axis direction. The supply unit 214 is a circular through-hole which penetrates the side wall 212 in the Y-axis direction. The supply unit 214 interconnects the supply pipe 20 and the defibrating chamber 210. Thus, the supply unit 214 is opened at a position vertically upward, that is, −Z direction from the axis AR of the rotational shaft 501 in the side wall 212. In other words, in the side wall 212, the supply unit 214 is opened at a position further away from the later-described discharge section 314 than from the axis AR.

As illustrated in FIG. 4, FIG. 6, FIG. 10, a side wall 213 has a circular plate shape. The side wall 213 is located on −Y direction side of the fixing member 211. The side wall 213 is located on −Y direction side of the rotary blades 503 of the rotational body 500. The side wall 213 is fixed to the fixing member 211 via the screen 221, thereby defining the inner surface of the defibrating chamber 210 on −Y direction side. The side wall 213 is provided with the supporting units 402 that supports −Y direction side of the rotary blades 503 in the rotational shaft 501 of the rotational body 500.

As illustrated in FIG. 4, FIGS. 6 to 9, FIGS. 11 to 14, the screen 221 has a thin plate shape. The screen 221 is located between the fixing member 211 and the side wall 213 in the Y-axis direction. The screen 221 is fixed to the fixing member 211, and the side wall 213, thus formed in an annular shape. The screen 221 is provided at an interval from the rotary blades 503 in the radial direction RR.

The dimension of the screen 221 in the Y-axis direction, that is, the width dimension of the screen 221 is larger than the dimension of each rotary blade 503 in the Y-axis direction. In the Y-axis direction, the tip end of each rotary blade 503 is located within the width of the screen 221. The screen 221 is fixed to the fixing member 211 and the side wall 213, thereby defining the inner circumferential surface the defibrating chamber 210 in a cylindrical shape. The screen 221 defines a region of the inner circumferential surface the defibrating chamber 210, the region being opposed to the tip end of each rotary blade 503. The screen 221 is an example of an annular wall.

The screen 221 is comprised of a thin plate member made of metal, for instance. The screen 221 of the embodiment is fixed to the fixing member 211 and the side wall 213 so that multiple thin plate members are arranged in the circumferential direction CR, thereby being formed in an annular shape. For instance, stainless steel can be used as a metal material.

As illustrated in FIG. 4, FIGS. 9 to 14, the housings 311, 312, 313 are provided to surround the outside of the screen 221 in the circumferential direction CR. The housings 311, 312, 313 cover the outside of the screen 221 over the entire circumference in the circumferential direction CR, thereby forming the discharge path 310. The housings 311, 312, 313 are fixed to the fixing member 211 and the side wall 213 with the screen 221 interposed with the fixing member 211 and with the side wall 213. In this case, the side wall 213 can be called an example of a fixing member that fixes the screen 221.

The housings 311, 312, 313 have an outer circumferential wall 351, a side wall 352, and a side wall 353. The outer circumferential wall 351 is provided at an interval from the screen 221 by an interval W in the radial direction RR. The outer circumferential wall 351 has an annular shape. The interval W between the outer circumferential wall 351 and the screen 221 in the radial direction RR is the inner dimension of the discharge path 310 in the radial direction RR.

The outer circumferential wall 351 defines the inner circumferential surface of the discharge path 310. The side wall 352 is located on +Y direction side of the outer circumferential wall 351, and extends in the circumferential direction CR. The side wall 352 has an inner surface 355, which defines the inner surface of the discharge path 310 on +Y direction side. The side wall 353 is located on −Y direction side of the side wall 352, and extends in the circumferential direction CR. The side wall 353 has an inner surface 356, which defines the inner surface of the discharge path 310 on −Y direction side. The interval D between the inner surface 355 and the inner surface 356 in the Y-axis direction is the width dimension of the discharge path 310 in the Y-axis direction. Three housings 311, 312, 313 are fixed to the fixing member 211 and the side wall 213 with the screen 221 interposed so as to be arranged in the circumferential direction CR, thus the discharge path 310 of the embodiment is formed in an annular shape.

As illustrated in FIG. 4, FIGS. 11 to 14, the discharge path 310 is provided outside of the screen 221 over the entire circumference in the circumferential direction CR. The discharge path 310 has a width in the Y-axis direction, and extends in the circumferential direction CR of the screen 221. The discharge path 310 communicates with the defibrating chamber 210 through multiple through-holes 222 provided in the screen 221. The defibrated material formed in the defibrating chamber 210 is discharged to the discharge path 310 through the multiple through-holes 222. Note that the discharge path 310 may be formed by one housing member.

The outer circumferential wall 351 of the housing 311 is provided with the discharge pipe 30 and the discharge section 314. The discharge pipe 30 is provided on +Z direction side of the outer circumferential wall 351 of the housing 311. The discharge pipe 30 is located on +Z direction side, which is vertically downward from the axis AR of the rotational shaft 501. Thus, the discharge pipe 30 is provided at the lowest position of the outer circumferential wall 351. The discharge pipe 30 has a pipe shape. The discharge pipe 30 extends from the outer circumferential wall 351 in +Z direction.

The discharge section 314 is a through-hole which penetrates the outer circumferential wall 351 in the Z-axis direction. The discharge section 314 has an approximately square shape as seen in the Z-axis direction. An opening edge 315 is the edge of an opening, close to the discharge path 310, of the discharge section 314. The dimension of the opening edge 315 in the Y-axis direction is the same as the inner dimension of the discharge path 310 in the Y-axis direction. The dimension of the opening edge 315 in the X-axis direction is set to 40 mm to 50 mm. The dimension of the discharge section 314 in the Y-axis direction is the same as the inner dimension of the discharge path 310 in the Y-axis direction.

The discharge section 314 interconnects the discharge path 310 and the discharge pipe 30. The discharge section 314 is provided in the outer circumferential wall 351, and is opened toward the screen 221. Thus, in the outer circumferential wall 351, the discharge section 314 is provided at a position in +Z direction, which is vertically downward from the axis AR of the rotational shaft 501. In other words, the discharge section 314 is provided at the lowest position of the outer circumferential wall 351.

In the embodiment, the interval D between the side wall 352 and the side wall 353 is the same over the entire circumference of the screen 221. The interval D is set to a predetermined dimension from 40 mm to 50 mm, for instance. In contrast, the interval W between the outer circumferential wall 351 and the screen 221 is greater in an opposing region opposed to the discharge section 314 than in a region further away from the opposing region in the circumferential direction CR of the screen 221.

Figure 14:
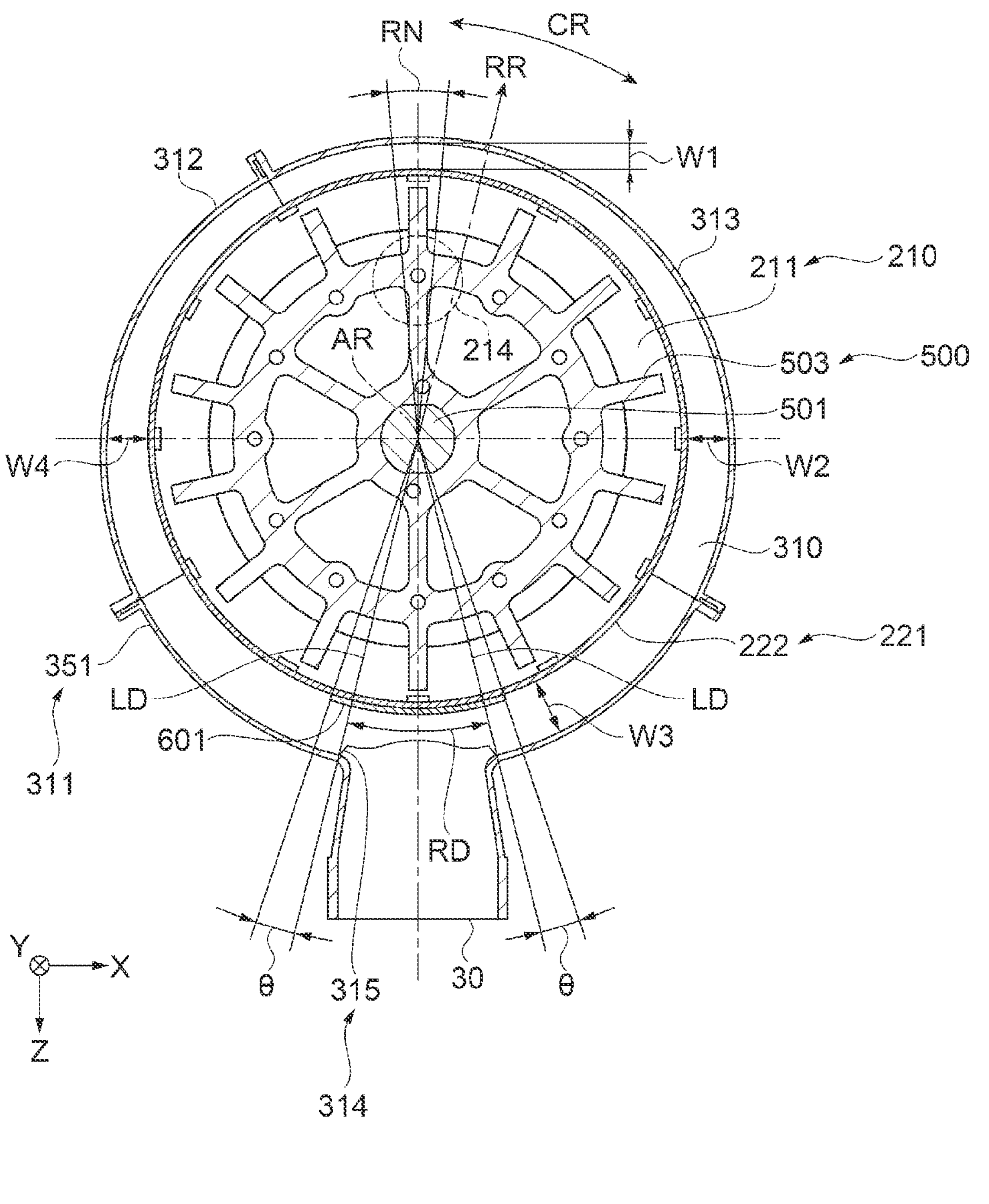
FIG. 14 is a cross-sectional view illustrating the specifications of a discharge path and a discharge section.

For instance, as illustrated in FIG. 14, in the discharge path 310, let width W1 be the width W of the region located in −Z direction from the axis AR, let width W2 be the width W of the region located in +X direction from the axis AR, let width W3 be the width W of the region located in +Z direction from the axis AR, and let width W4 be the width W of the region located in −X direction from the axis AR. Then, the width W1 is smaller than the width W3. In addition, the width W2 and the width W4 are smaller than the width W3. In addition, the width W1 is smaller than the width W2 and the width W4. Note that in the embodiment, the width W2 and the width W4 are the same.

In the embodiment, the width W gradually decreases as the distance from the discharge section 314 increases in the circumferential direction CR of the screen 221. The interval D between the side wall 352 and the side wall 353 is the same over the entire circumference of the screen 221. Therefore, the flow path cross-sectional area of the discharge path 310 gradually decreases as the distance from the discharge section 314 increases in the circumferential direction CR of the screen 221. In the embodiment, for instance, the width W1 is set to 5 mm, the width W2 and the width W4 are set to 10 mm, and the width W3 is set to 15 mm.

Figure 8:
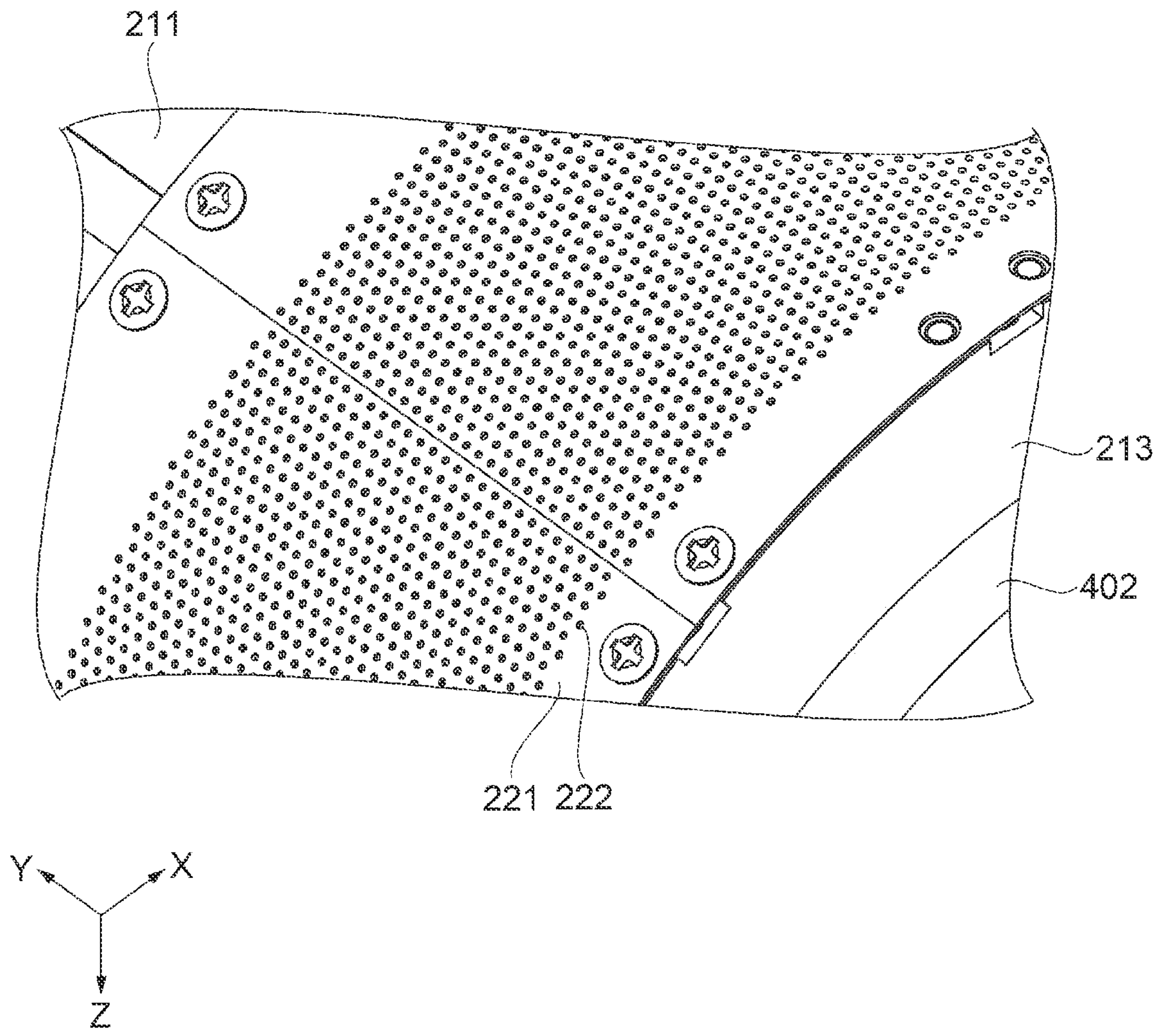
FIG. 8 is an enlarged view of VIII portion illustrated in FIG. 7.
Figure 9:
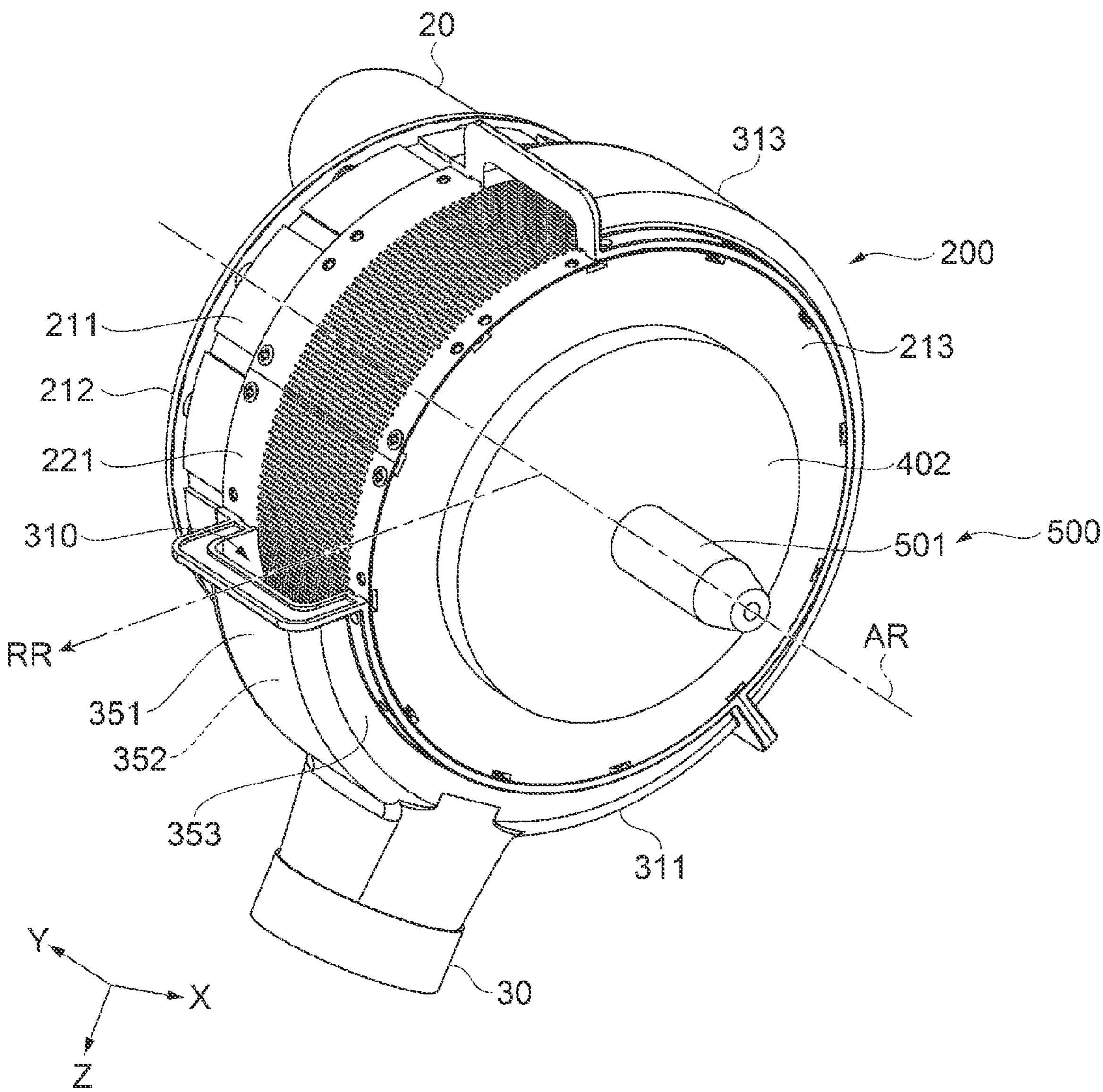
FIG. 9 is a perspective view illustrating the defibrating apparatus with its housing partially removed.

As illustrated in FIG. 8, in the screen 221, the multiple through-holes 222 penetrating the screen 221 are formed in the radial direction RR which is the thickness direction. In the embodiment, the multiple through-holes 222 have the same shape. The through-holes 222 of the embodiment are circular holes. The hole diameter of the through-holes 222 is set to a size which allows the material defibrated to a desired extent to pass through. The screen 221 may be produced by forming through-holes 222 in a thin plate member by a punching process, an etching process, a cutting process or the like. Note that the screen 221 may be comprised of one thin plate member.

Figure 16:
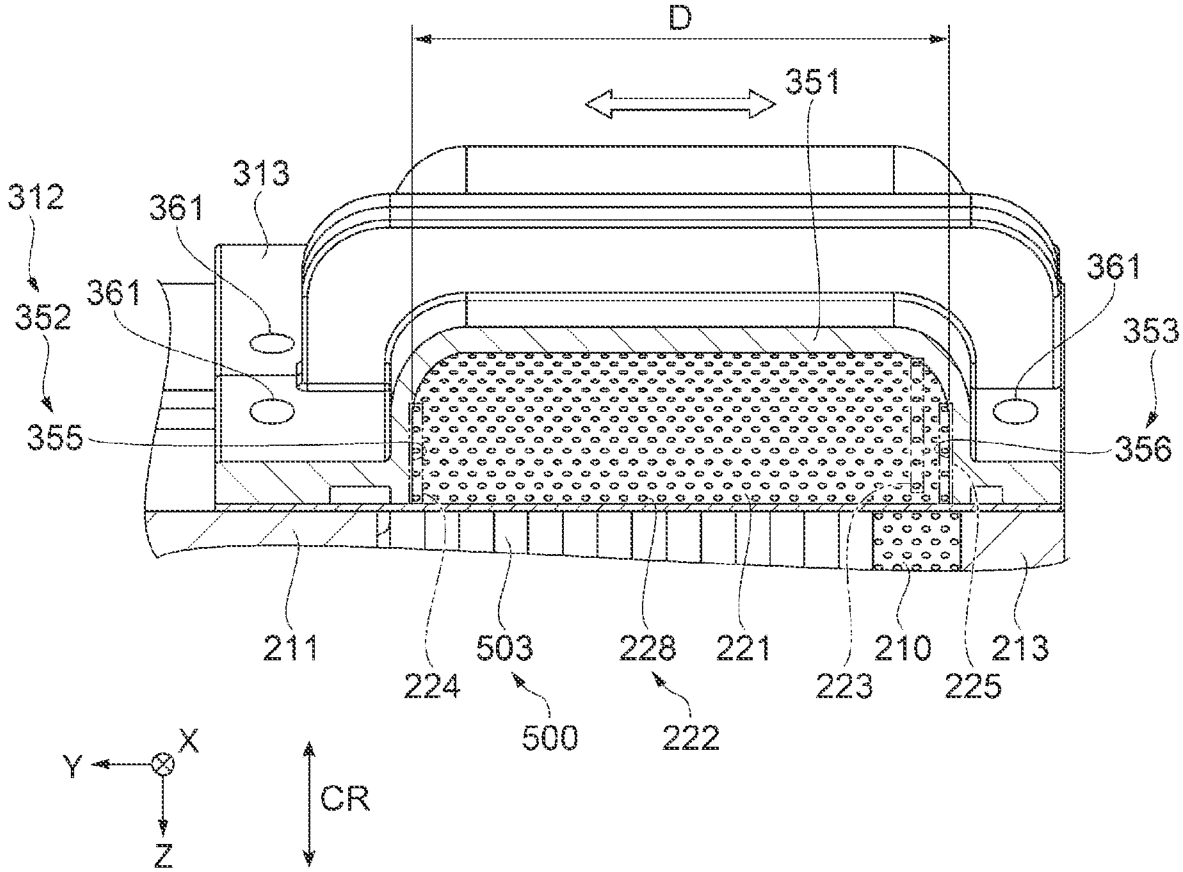
FIG. 16 is a cross-sectional view illustrating a cross section along XVI-XVI illustrated in FIG. 3.
Figure 17:
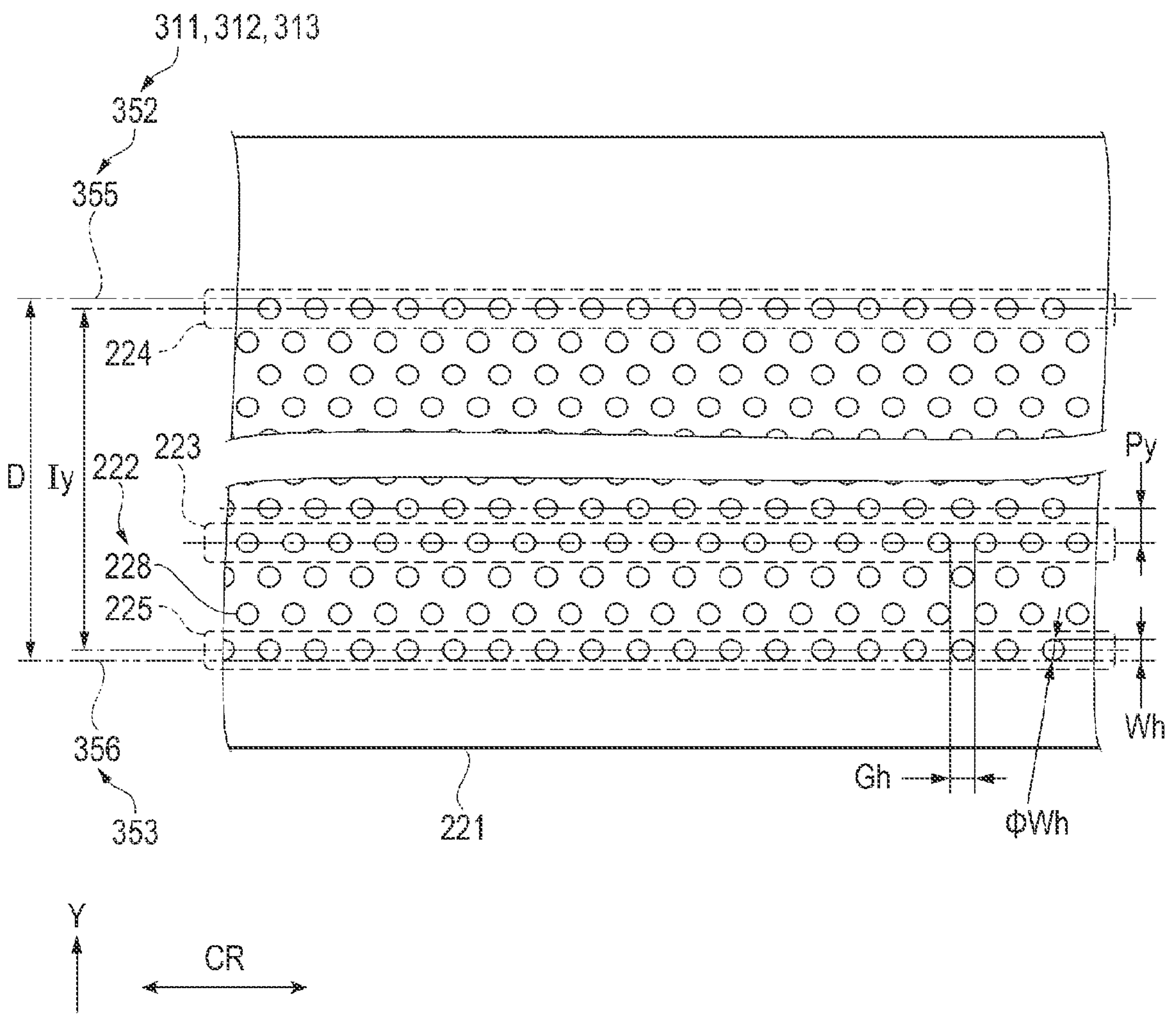
FIG. 17 is a partial development view of the screen as seen from the discharge path.

As illustrated in FIG. 7, FIG. 8, FIG. 11, FIG. 16, FIG. 17, the multiple through-holes 222 are provided so as to be distributed in the circumferential direction CR of the screen 221. To illustrate the arrangement of the multiple through-holes 222, FIG. 17 shows a development view in which the annular screen 221 as seen from the discharge path 310 is developed into a flat plate shape. Thus, FIG. 17 corresponds to a state of the annular screen 221, in which it is seen in the radial direction RR. In addition, the Y-axis direction, and the circumferential direction CR illustrated in FIG. 17 correspond to those when the screen 221 is fixed to the fixing member 211 and the side wall 213 to define the defibrating chamber 210. In FIG. 17, chain double-dashed lines indicate the positions of the inner surfaces 355, 356 when the discharge path 310 is formed by covering the outside of the screen 221 with the housings 311, 312, 313. The same applies to FIG. 18 to FIG. 20 which show the later-described other embodiments of the screen 221.

As illustrated in FIG. 17, in the screen 221, multiple through-hole rows 223 are provided with the same center-to-center pitch Py in the Y-axis direction, and each through-hole row 223 includes the through-holes 222 with a hole diameter φWh arranged at interval Gh in the circumferential direction CR. In other words, in the screen 221, multiple through-hole rows 223 are provided at the same interval (Py−Wh) in the Y-axis direction, and each through-hole row 223 includes the through-holes 222 with the hole diameter φWh arranged at the interval Gh in the circumferential direction CR.

In addition, in the screen 221, a pair of through-hole rows 224, 225 are provided corresponding to the positions of the inner surfaces 355, 356. In the embodiment, the through-hole rows 224, 225 are formed by arranging the through-holes 222 with the hole diameter φWh at the interval Gh in the circumferential direction CR. The through-hole rows 224, 225 are provided with the same center-to-center pitch Py between through-hole rows 223 adjacent in the Y-axis direction. As a result, the center-to-center pitch Iy between the through-hole row 224 and the through-hole row 225 is an integral multiple of the center-to-center pitch Py. Thus, the through-hole rows 224, 225 are included in multiple through-hole rows 223.

In the embodiment, the through-holes 222 are displaced in the circumferential direction CR with respect to other through-holes 222 included in the adjacent through-hole rows 223 in the Y-axis direction. In other words, multiple through-holes 222 are provided in the screen 221 in a so-called staggered pattern. In the embodiment, the through-holes 222 are displaced in the circumferential direction CR by half (Gh+Wh) as the center-to-center pitch with respect to other through-holes 222 included in the adjacent through-hole rows 223 in the Y-axis direction.

The hole diameter Wh of each through-hole 222 is preferably φ0.3 mm or more and φ2.0 mm or less. The interval Gh between adjacent through-holes 222 is preferably the same dimension as the thickness of the screen 221 to twice the hole diameter Wh of each through-hole 222, and is more preferably half the hole diameter Wh of each through-hole 222 to twice the hole diameter Wh. The interval Gh between adjacent through-holes 222 is the dimension of the remaining part of the screen 221, which is the shortest distance between the opening edges of adjacent through-holes 222.

In the embodiment, the hole diameter φWh, and the center-to-center pitch Py between adjacent through-hole rows 223 are set so that the interval between each through-hole 222 and six other through-holes 222 which surround the through-hole 222 is equal to the interval Gh between the through-hole 222 and another adjacent through-hole 222 in the circumferential direction CR. For instance, the hole diameter Wh of each through-hole 222 is set to φ0.6 mm, and the center-to-center pitch Py between adjacent through-hole rows 223 in the Y-axis direction is set to φ1.5 mm. In this case, the interval Gh between adjacent through-holes 222 is Gh=2/(3ˆ0.5)*Py−Wh=1.1 mm. Alternatively, the interval Gh between adjacent through-holes 222 is Gh=(3ˆ0.5)*Py−Wh=2.0 mm. When through-hole rows 223 including the through-hole rows 224, 225 are arranged in 29 rows in the Y-axis direction, the center-to-center pitch Iy between the through-hole row 224 and the through-hole row 225 is 42 mm.

Let discharge path-side opening edge 228 be the opening edge, close to the discharge path 310, of each through-hole 222. At this point, the through-hole row 224 is provided at a position where the discharge path-side opening edge 228 of the through-holes 222 included in the through-hole row 224 is overlapped with the inner surface 355 as seen in the radial direction RR. In addition, the through-hole row 225 is provided at a position where the discharge path-side opening edge 228 of the through-holes 222 included in the through-hole row 225 is overlapped with the inner surface 356 as seen in the radial direction RR. As illustrated in FIG. 16, the fixing member 211 is located on +Y direction side with respect to the inner surface 355, and the through-hole row 224 in the Y-axis direction. In addition, the side wall 213 is located on −Y direction side with respect to the inner surface 356, and the through-hole row 225 in the Y-axis direction.

Thus, let a communication hole Ch be a through-hole 222 which interconnects the defibrating chamber 210 and the discharge path 310, then the through-hole row 224 is provided at a position where the discharge path-side opening edge 228 of the communication holes Ch included in the through-hole row 224 is overlapped with the inner surface 355 as seen in the radial direction RR. In addition, the through-hole row 225 is provided at a position where the discharge path-side opening edge 228 of the communication holes Ch included in the through-hole row 225 is overlapped with the inner surface 356 as seen in the radial direction RR. The through-hole rows 224, 225 are an example of a pair of communication hole groups. In addition, the through-hole row 224 is an example of one of the communication hole groups, and the through-hole row 225 is an example of the other of the communication hole groups.

FIG. 17 shows the case where in the through-hole row 224, +Y direction side of the discharge path-side opening edge 228 of the through-hole 222 is in contact with the inner surface 355, and in the through-hole row 225, −Y direction side of the discharge path-side opening edge 228 of the through-holes 222 is in contact with the inner surface 356. In this case, in the through-holes 222 of the through-hole rows 224, 225, the ratio of the opening area opened in the discharge path 310 to the opening area opened, close to the discharge path 310, of the through-holes 222 is 100%. When manufacturing variation in components such as the screen 221, the housings 311, 312, 313, and position variation in the housings 311, 312, 313 with respect to the screen 221 are taken into consideration, the interval D between the inner surface 355 and the inner surface 356 is set to a dimension which satisfies $Iy-Wh<D\leq Iy+Wh$.

The ratio of the opening area opened in the discharge path 310 to the opening area opened, close to the discharge path 310, of the through-holes 222 is preferably 50% or higher, and more preferably 80% or higher. In the embodiment, as illustrated in FIG. 16, the housings 311, 312, 313 are fixed to the fixing member 211 and the side wall 213 with the screen 221 covered by the housings 311, 312, 313. The housings 311, 312, 313 are fixed to the fixing member 211 and the side wall 213 with the screen 221 interposed with the fixing member 211 and with the side wall 213. In addition, the housings 311, 312, 313 are fixed to the fixing member 211 and the side wall 213 by inserting fixing screws (not illustrated) into threaded holes 361 provided in the housings 311, 312, 313, and tightening the fixing screws.

For instance, when the housing 312 is fixed to the fixing member 211 and the side wall 213, first, the housing 312 is arranged at a position for covering the screen 221. At this point, the screen 221 is fixed to the fixing member 211 and the side wall 213. The dimension of the screen 221 in the Y-axis direction, that is, the width dimension of the screen 221 is larger than the interval D between the inner surface 355 and the inner surface 356. Thus, as indicated by the white arrow in FIG. 16, the position of the housing 312 is movable in the Y-axis direction with respect to the screen 221 with the screen 221 covered by the housing 312.

The position of the housing 312 is movable in the Y-axis direction with respect to the screen 221 with the screen 221 interposed with the fixing member 211 and with the side wall 213. Thus, the position of the housing 312 is adjustable at a position where the inner surface 355 is overlapped with the discharge path-side opening edge 228 of the through-hole row 224 provided in the screen 221, and the inner surface 356 is overlapped with the discharge path-side opening edge 228 of the through-hole row 225.

The hole size of the threaded hole 361 is set to be greater than the diameter of the fixing screw so that the housing 312 can be tightened and fixed to the fixing member 211 and the side wall 213 by a fixing screw with the position of the housing 312 adjusted with respect to the screen 221. Thus, in the embodiment, the housing 312 can be fixed to the fixing member 211 and the side wall 213 with the position of the housing 312 adjusted with respect to the screen 221.

In the embodiment, it may be stated that multiple through-hole rows each including through-holes 222 arranged in the Y-axis direction are provided over the entire circumference of the screen 221 at the same interval Gh in the circumferential direction CR. However, multiple through-hole rows each including through-holes 222 arranged in the Y-axis direction may be provided over the entire circumference of the screen 221 at some different intervals in the circumferential direction CR. Alternatively, through-hole groups each including through-holes 222 arranged in the Y-axis direction and the circumferential direction CR may be provided over the entire circumference of the screen 221 at the same intervals in the circumferential direction CR. In the embodiment, the same number of through-holes 222 are arranged in the Y-axis direction to form each through-hole row; however, through-hole rows may have different numbers of through-holes to form each through-hole row.

When the through-holes 222 are formed in a thin plate member by an etching process, for instance, SUS430, SUS304, and SUS316L may be used as the material for the thin plate member. Alternatively, the screen 221 may be a mesh formed by weaving wires. In this case, the pores of the mesh correspond to the through-holes 222.

As illustrated in FIG. 4, FIGS. 11 to 14, the blocking member 601 is provided on the outer circumferential surface, close to the discharge path 310, of the screen 221. The blocking member 601 is provided in an opposing region, of the screen 221, opposed to the discharge section 314. The blocking member 601 is located in +Z direction from the axis AR. The blocking member 601 blocks the openings, close to the discharge path 310, of the through-holes 222 by covering the outer circumferential surface, close to the discharge path 310, of the screen 221. The blocking member 601 blocks the through-holes 222 provided in a region which is close to the discharge section 314 in the screen 221. Note that the blocking member 601 may be provided on the inner circumferential surface, close to the defibrating chamber 210, of the screen 221. In this case, the blocking member 601 blocks the openings, close to the defibrating chamber 210, of the through-holes 222 by covering the inner circumferential surface, close to the defibrating chamber 210, of the screen 221.

In the embodiment, the dimension of the blocking member 601 in the Y-axis direction is the same as the dimension of the discharge path 310 in the Y-axis direction. The dimension of the blocking member 601 in the X-axis direction is greater than the dimension of the opening edge 315 in the discharge section 314 in the X-axis direction.

As illustrated in FIG. 14, the angle formed between the line segment connecting the axis AR and the end of the blocking member 601 in +X direction, and the line segment connecting the axis AR and the end of the opening edge 315 in +X direction is θ. In addition, the angle formed between the line segment connecting the axis AR and the end of the blocking member 601 in −X direction, and the line segment connecting the axis AR and the end of the opening edge 315 in −X direction is θ. Thus, the position of the end of the blocking member 601 in +X direction is located away in +X direction by the angle θ relative to the position of the end of the opening edge 315 in +X direction. In addition, the position of the end of the blocking member 601 in −X direction is located away in −X direction by the angle θ relative to the position of the end of the opening edge 315 in −X direction. In the embodiment, the angle θ is set to 5° to 15°, for instance.

In the screen 221, the through-holes 222 provided in the region with the outer circumferential surface covered by the blocking member 601 do not interconnect the defibrating chamber 210 and the discharge path 310. In other words, in the screen 221, the region with the outer circumferential surface covered by the blocking member 601 is not provided with any communication hole Ch. In the embodiment, the region between the center of the discharge section 314 and the rotational shaft 501 of the screen 221 in the Z-axis direction is not provided with any communication hole Ch.

Let projection line segment be the line segment which is perpendicular to the axis AR and connects the axis AR and the center of the discharge section 314, and let projection direction be the direction along the projection line segment. In the embodiment, when the opening edge 315 of the discharge section 314 is projected onto the screen 221, the region surrounded by the opening edge 315 projected onto the screen 221 is not provided with any communication hole Ch. In the embodiment, the above-mentioned projection direction is a direction along the Z-axis direction. The region surrounded by the opening edge 315 projected onto the screen 221 is an example of an opposing region, in the screen 221, opposed to the discharge section 314.

Let virtual line segment LD be the line segment which is perpendicular to the axis AR and connects the axis AR and the opening edge 315 of the discharge section 314, and let region RD be the region surrounded by the virtual line segment LD in the screen 221, then the region RD is not provided with any communication hole Ch in the embodiment. The region RD is an example of an opposing region, in the screen 221, opposed to the discharge section 314.

As a result, let region ERD (not illustrated) be the region other than the region RD in the screen 221, then the number of communication holes Ch provided per unit area in the region RD is less than the number in the region ERD. In the screen 221, let region RN be the region with the interval W1 which is the smallest interval W between the outer circumferential wall 351 and the screen 221, and let region ERN (not illustrated) be the region other than the region RN, then the number of communication holes Ch provided per unit area in the region RN is greater than the number in the region ERN.

The number of communication holes Ch provided per unit area in the region RN is greater than the number in the region RD. In the embodiment, the region RN, and the region with the interval W1 which is the smallest interval W in the discharge path 310 are located in −Z direction which is vertically upward from the axis AR. Thus, the region RN is an example of a region of the screen 221, furthest away from the discharge section 314 in the circumferential direction CR.

In the embodiment, the outer circumferential surface of the screen 221 is covered by the blocking member 601, thus, the region not provided with any through-hole 222 is formed in the screen 221, the through-holes 222 interconnecting the defibrating chamber 210 and the discharge path 310. However, in the screen 221 of the embodiment, any through-hole 222 is not formed in the region with the outer circumferential surface covered by the blocking member 601, thus in the screen 221, the region may be formed, which is not provided with any through-hole 222 which interconnects the defibrating chamber 210 and the discharge path 310.

Next, the operation of the defibrating apparatus 200 will be described. The defibrating apparatus 200 guides the raw material MA supplied to the defibrating chamber 210 to the gap between the rotary blades 503 of the rotating rotational body 500 and the screen 221 by air flow, and performs a dry defibration process on the raw material MA.

In the embodiment, as illustrated in FIG. 4, the raw material MA injected from the supply pipe 20 of the defibrating apparatus 200 is introduced to the defibrating chamber 210 through the supply unit 214. In the defibrating chamber 210, the rotational shaft 501 is rotationally driven, thereby causing the rotational body 500 to rotate. In addition, a negative pressure due to the suction unit 35 is applied to the discharge path 310 through the discharge pipe 30. Therefore, in the defibrating chamber 210, the discharge path 310 and the discharge pipe 30, an air flow is generated as indicated by a dashed line arrow in FIG. 4.

This air flow sends the raw material MA to the gap between the tip ends of the rotary blades 503 and the screen 221. The raw material MA sent to the gap flies by receiving a centrifugal force from the rotational body 500, collides with the screen 221, and is disintegrated and defibrated. That is, in the defibrating chamber 210, the raw material MA is defibrated to produce a defibrated material.

The defibrated material generated in the defibrating chamber 210 passes through the through-holes 222 of the screen 221 due to air flow, and flows into the discharge path 310. The defibrated material flowed into the discharge path 310 is moved to the discharge pipe 30 by an air flow through the discharge section 314, and discharged to the pipe 3 coupled to the discharge pipe 30. The air flow causing the defibrated material to move is generated by the pressure difference between the negative pressure applied to the discharge pipe 30 by the suction unit 35, and the pressure in the discharge section 314, the discharge path 310, and the defibrating chamber 210, which are upstream of the discharge pipe 30. For instance, the air flow which passes through the through-holes 222 of the screen 221 is generated by the pressure difference between the negative pressure applied to the discharge path 310 from the suction unit 35 and the pressure in the defibrating chamber 210.

In the vicinity of the inner surface of the discharge path 310 defined by the inner surfaces 355, 356 of the housings 311, 312, 313 in the discharge path 310, it is more difficult to ensure the air flow than in the vicinity of the center of the discharge path 310 in the Y-axis direction. Therefore, the defibrated material discharged from the defibrating chamber 210 to the discharge path 310 may stagnate in the vicinity of the inner surface of the discharge path 310.

In the embodiment, in the screen 221, the through-hole row 224 is provided at a position where the discharge path-side opening edge 228 of the communication holes Ch included in the through-hole row 224 is overlapped with the inner surface 355 as seen in the radial direction RR. Thus, an air flow along the inner surface 355 is likely to be ensured, and the defibrated material can be prevented from stagnating in the vicinity of the inner surface 355. In addition, the through-hole row 225 is provided at a position where the discharge path-side opening edge 228 of the communication holes Ch included in the through-hole row 225 is overlapped with the inner surface 356 as seen in the radial direction RR. Thus, an air flow along the inner surface 356 is likely to be ensured, and the defibrated material can be prevented from stagnating in the vicinity of the inner surface 356.

In the discharge path 310, a negative pressure due to the suction unit 35 is likely to be applied to a region close to the discharge section 314. Thus, in the through-holes 222 provided in a region close to the discharge section 314, the flow rate of the air passing from the defibrating chamber 210 to the discharge path 310 is likely to increase. Furthermore, in the through-holes 222 provided in the region close to the discharge section 314, the flow speed of the air passing from the defibrating chamber 210 to the discharge path 310 is likely to increase. In this case, in the through-holes 222 provided in the region close to the discharge section 314, an incompletely defibrated material which has not been sufficiently defibrated may be discharged to the discharge path 310. Also, the defibrated material may be clogged in some through-holes 222.

In the through-holes 222 provided in a region close to the discharge section 314, when the flow rate of the air passing from the defibrating chamber 210 to the discharge path 310 increases, a negative pressure due to the suction unit 35 is unlikely to be applied to a region away from the discharge section 314. Thus, in the through-holes 222 provided in a region away from the discharge section 314, the flow speed of the air passing from the defibrating chamber 210 to the discharge path 310 is likely to decrease. In a region where the flow speed of the air passing through the through-holes 222 of the screen 221 is low, the defibrated material is unlikely to pass through the through-holes 222. As a result, an excessively defibrated material increases in the amount, which has stagnated for a long time in the defibrating chamber 210 and been defibrated to an excessive extent.

Figure 15:
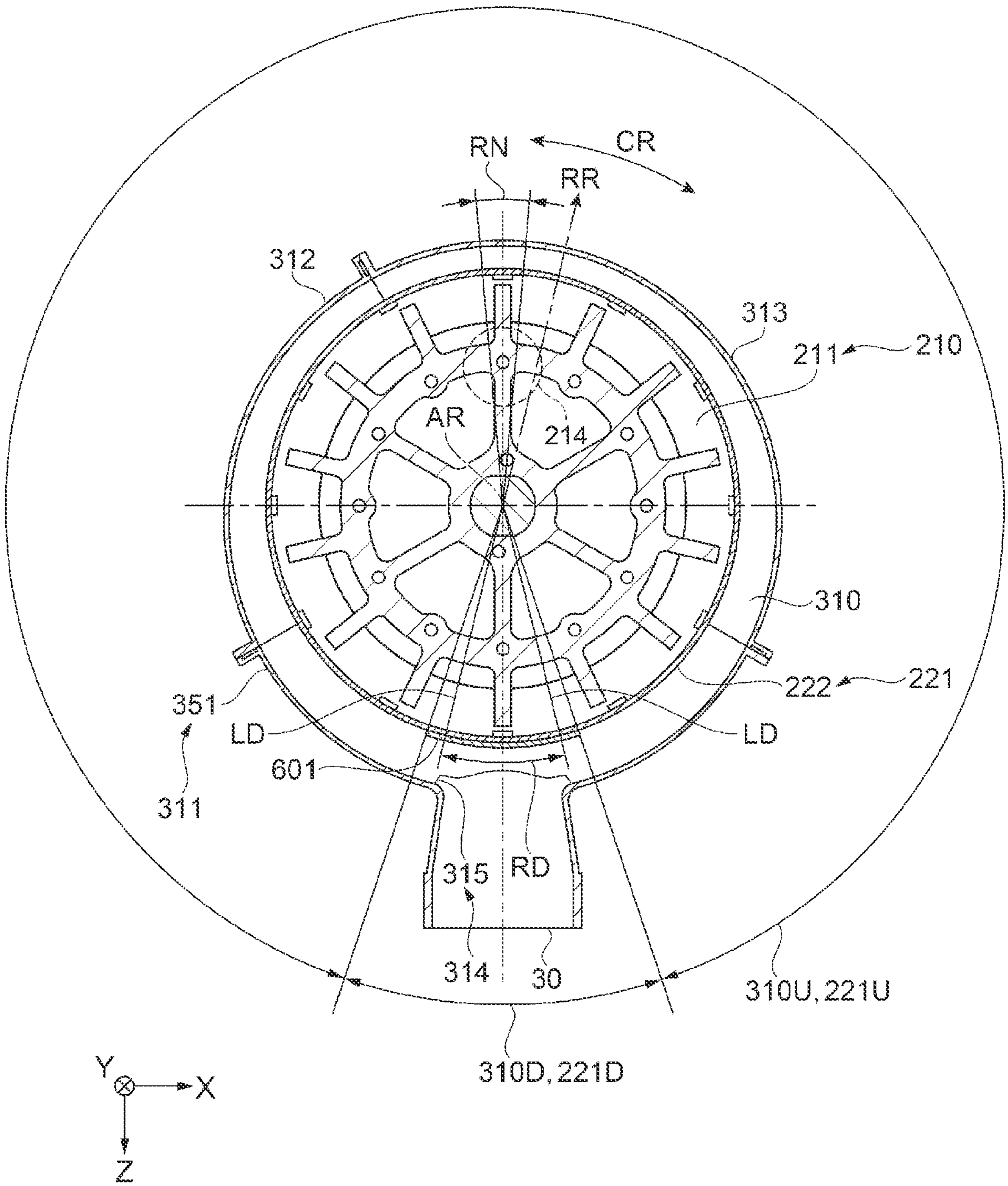
FIG. 15 is a cross-sectional view illustrating the specifications of the discharge path and a screen.

In the embodiment, for instance, as illustrated in FIG. 15, let downstream-side discharge path 310D close to the discharge section 314 be a region of the discharge path 310, including the discharge section 314, and let upstream-side discharge 310U away from the discharge section 314 be the region other than the downstream-side discharge path. Let downstream-side screen 221D be the region of the screen 221, constituting the downstream-side discharge path 310D, and let upstream-side screen 221U be the region constituting the upstream-side discharge 310U. Let communication hole Ch be each through-hole 222 which interconnects the defibrating chamber 210 and the discharge path 310, the number of communication holes Ch provided per unit area in the downstream-side screen 221D is less than the number in the upstream-side screen 221U.

In other words, when the downstream-side screen 221D and the upstream-side screen 221U having the same area are compared with each other, the screen 221 is provided with communication holes Ch so that air is more unlikely to pass through in the downstream-side screen 221D than in the upstream-side screen 221U. Note that in the embodiment, when the blocking member 601 is provided, the downstream-side discharge path 310D is a region including the region RD, the blocking member 601, and the discharge section 314, whereas the upstream-side discharge 310U is a region including the region RN, and not including the blocking member 601, and the discharge section 314. The downstream-side screen 221D is an example of a downstream-side annular wall, and the upstream-side screen 221U is an example of an upstream-side annular wall.

Thus, as compared to when the number of communication holes Ch provided per unit area is the same over the entire circumference of the screen 221, it is possible to reduce the flow rate of the air passing through the through-holes 222 of the downstream-side screen 221D from the defibrating chamber 210 to the discharge path 310. In addition, a negative pressure due to the suction unit 35 is likely to be applied to the upstream-side discharge 310U. Furthermore, it is likely to increase the flow speed of the air passing through the through-holes 222 of the upstream-side screen 221U from the defibrating chamber 210 to the discharge path 310. As a result, it is possible to reduce discharge of an incompletely defibrated material which has not been sufficiently defibrated, from the through-holes 222 of the downstream-side screen 221D to the discharge path 310. In addition, it is possible to reduce an excessively defibrated material which has been defibrated to an excessive extent. Also, an air flow along the inner surface of the upstream-side discharge 310U is likely to be ensured, and the defibrated material discharged to the upstream-side discharge 310U can be prevented from stagnating in the vicinity of the inner surfaces 355, 356.

In addition, the pressure difference between the pressure in the downstream-side discharge path 310D and the pressure in the upstream-side discharge 310U is likely to reduce. The speed difference between the flow speed of the air passing through the through-holes 222 of the downstream-side screen 221D and the flow speed of the air passing through the through-holes 222 of the upstream-side screen 221U is likely to reduce. Thus, variation in defibration degree of the defibrated material discharged to the discharge path 310 can be reduced. In addition, the defibrated material discharged to the upstream-side discharge 310U can be prevented from stagnating in the vicinity of the inner surfaces 355, 356.

Figure 11:
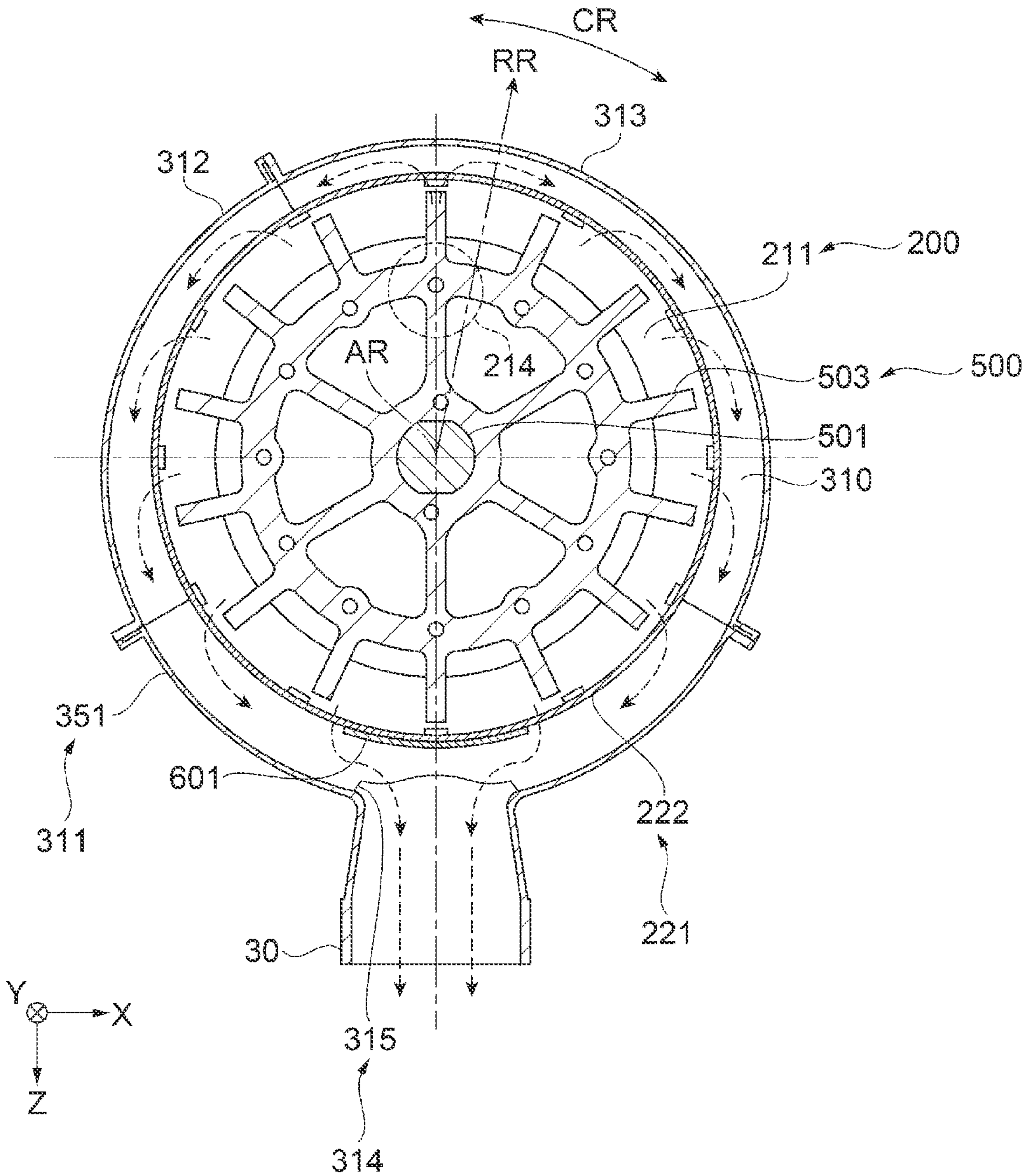
FIG. 11 is a cross-sectional view illustrating a cross section along XI-XI illustrated in FIG. 2.

In the embodiment, as illustrated in FIG. 11, the discharge path 310 is provided to cover the outside of the screen 221 over the entire circumference. The discharge section 314 is provided in the outer circumferential wall 351 of the housings 311, 312, 313 forming the discharge path 310, and is opened to the screen 221. Thus, in the discharge path 310, a negative pressure due to the suction unit 35 is likely to be applied to the side away upstream from the discharge section 314. Therefore, in the screen 221, an excessively defibrated material can be prevented from being discharged to a region away from the discharge section 314, and variation in defibration degree of the defibrated material discharged to the discharge path 310 can be reduced.

As illustrated by a dashed arrow in FIG. 11, in the discharge path 310, a clockwise air flow toward the discharge section 314 can be generated in the region on +X direction side of the axis AR, and a counterclockwise air flow toward the discharge section 314 can be generated in the region on −X direction side of the axis AR. At this point, in the discharge path 310, a clockwise air flow toward the discharge section 314 and a counterclockwise air flow toward the discharge section 314 can be generated in the region furthest away from the discharge section 314 and located in −Z direction which is vertically upward from the axis AR.

As described above, the following effects can be obtained by the defibrating apparatus 200 and the sheet manufacturing apparatus 100 according to Embodiment 1.

The defibrating apparatus 200 includes: a rotational body 500 rotatable around a center at an axis AR of a rotational shaft 501; a defibrating chamber 210 that stores the rotational body 500, which when rotated, generates a defibrated material from a material MA containing fibers; a discharge path 310 that communicates with the defibrating chamber 210, and receives the defibrated material discharged from the defibrating chamber 210; a circular annular screen 221 that is provided at an interval from the rotational body 500 in a radial direction RR of the rotational body 500, and that defines the defibrating chamber 210; housings 311, 312, 313 that form the discharge path 310; and a plurality of through-holes 222 which are provided in the screen 221, and penetrate the screen 221 in the radial direction RR. The discharge path 310 has a width in the Y-axis direction, and extends in the circumferential direction CR of the screen 221. The housings 311, 312, 313 have the side walls 352, 353 extending in the circumferential direction CR, and the side walls 352, 353 have the inner surfaces 355, 356 that define the discharge path 310. Let communication hole Ch be each through-hole 222 that interconnects the defibrating chamber 210 and the discharge path 310, and let discharge path-side opening edge 228 be the opening edge, close to the discharge path 310, of the through-hole 222, then the screen 221 has through-hole rows 224, 225, each of which is formed by a plurality of communication holes Ch arranged at interval Gh in a circumferential direction CR, and the through-hole row 224 is provided at a position where the discharge path-side opening edge 228 of the communication holes Ch is overlapped with the inner surface 355 as seen in the radial direction RR. Thus, an air flow along the inner surface 355 is likely to be ensured, and the defibrated material can be prevented from stagnating in the vicinity of the inner surface 355.

The housings 311, 312, 313 have a pair of side walls 352, 353 provided at an interval D in the Y-axis direction, and the side walls 352, 353 have inner surfaces 355, 356. The screen 221 has a pair of through-hole rows 224, 225, one through-hole row 224 is provided at a position where the discharge path-side opening edge 228 of the communication holes Ch is overlapped with one inner surface 355 as seen in the radial direction RR, and the other through-hole row 225 is provided at a position where the discharge path-side opening edge 228 of the communication holes Ch is overlapped with the other inner surface 356 as seen in the radial direction RR. Thus, an air flow along the inner surfaces 355, 356 is likely to be ensured, and the defibrated material can be prevented from stagnating in the vicinity of the inner surfaces 355, 356.

In the communication holes Ch of the through-hole rows 224, 225, the ratio of the opening area opened in the discharge path 310 to the opening area opened, close to the discharge path 310, in the communication holes Ch is 50% or more. Thus, an air flow along the inner surfaces 355, 356 is further likely to be ensured, and the defibrated material can be prevented from stagnating in the vicinity of the inner surfaces 355, 356.

The screen 221 has a plurality of through-hole rows 223 at interval (Py−Wh) in the Y-axis direction, and each through-hole rows 223 includes the through-holes 222 arranged at interval Gh in the circumferential direction CR, the plurality of through-hole rows 223 includes a pair of through-hole rows 224, 225, and the through-holes 222 are displaced in the circumferential direction CR with respect to other through-holes 222 included in the adjacent through-hole rows 223 in the Y-axis direction. The opening ratio is defined by the ratio of the total of opening areas of the through-holes 222 provided in the screen 221 to the area of the screen 221 constituting the discharge path 310. For instance, as compared to when the through-holes 222 are arranged at the same position in the circumferential direction CR as other through-holes 222 included in adjacent through-hole rows 223, the above-described configuration can increase the opening rate, while ensuring the intervals between the through-holes 222. Thus, in the defibrating chamber 210, the through-holes 222 of the screen 221, and the discharge path 310, an air flow for discharging the defibrated material downstream of the discharge path 310 is likely to be ensured, and the defibrated material can be prevented from stagnating in the discharge path 310 including the vicinity of the inner surfaces 355, 356.

The intervals Gh between each through-hole 222 and other through-holes 222 that surround the through-hole 222 are the same. This can further increase the opening rate, while ensuring the intervals between the through-holes 222.

The dimension of the screen 221 in the Y-axis direction is greater than the dimension of the width of the discharge path 310, and the housings 311, 312, 313 form the discharge path 310 by covering the outside of the screen 221. Thus, it is easy to create a configuration which allows the positions of the housings 311, 312, 313 to be adjusted with respect to the screen 221 in the Y-axis direction.

A fixing member 211 that fixes the screen 221 is further provided, and the housings 311, 312, 313 are fixed to the fixing member 211 and the side wall 213 with the screen 221 interposed with the fixing member 211 and with the side wall 213. Thus, it is easy to create a configuration which allows the housings 311, 312, 313 to be fixed to the fixing member 211 and the side wall 213 with the positions of the housings 311, 312, 313 adjusted with respect to the screen 221.

The defibrating apparatus 200 further includes: a discharge pipe 30 that receives a negative pressure to discharge the defibrated material through the discharge path 310; and a discharge section 314 that interconnects the discharge path 310 and the discharge pipe 30. The housings 311, 312, 313 form the discharge path 310 in an annular shape by surrounding the outside of the screen 221 in the circumferential direction CR, and have an outer circumferential wall 351 provided at an interval from the screen 221 in the radial direction RR. The discharge section 314 is provided in the outer circumferential wall 351, and opened toward the screen 221. Thus, also when the discharge path 310 is provided on the outside of the screen 221 over the entire circumference, the discharge section 314 is provided so as to be opened toward the screen 221, thus in the discharge path 310, a negative pressure due to the suction unit 35 is likely to be applied to the side away upstream from the discharge section 314. Thus, in the defibrating chamber 210, the through-holes 222 of the screen 221, and the discharge path 310, an air flow for discharging the defibrated material downstream of the discharge path 310 can be ensured, and the defibrated material can be prevented from stagnating.

The sheet manufacturing apparatus 100 includes: the defibrating apparatus 200; the second web former 70 that forms the second web Wb2 by accumulating the defibrated material discharged from the defibrating apparatus 200; and the sheet former 80 that forms the sheet S containing fibers by binding the fibers contained in the second web Wb2. Thus, the sheet manufacturing apparatus 100 can form the sheet S from the defibrated material generated by the defibrating apparatus 200.

The defibrating apparatus 200 and the sheet manufacturing apparatus 100 according to the embodiment of the present disclosure are based on the configuration described above; however, it is obviously possible to make partial change or omission on the configuration in a range not departing from the spirit of the present disclosure. In addition, the embodiment and other embodiments described below can be implemented in a combination within a technically consistent range. The other embodiments will be described below.

In the embodiment, the pair of through-hole rows 224, 225 may not be provided over the entire circumference of the screen 221. For instance, the pair of through-hole rows 224, 225 may be provided in the region RN of the screen 221, and may not be provided in the region ERN. Accordingly, the number of communication holes Ch provided per unit area in the region RN may be made greater than the number in the region ERN. Alternatively, for instance, the pair of through-hole rows 224, 225 may be provided in the upstream-side screen 221U, and may not be provided in the downstream-side screen 221D. Accordingly, the number of communication holes Ch provided per unit area in the upstream-side screen 221U may be made greater than the number in the downstream-side screen 221D.

In the embodiment, the screen 221 does not need to have the pair of through-hole rows 224, 225. For instance, when the defibrating apparatus 200 is disposed in the sheet manufacturing apparatus 100 in a posture in which the axis AR is along the vertical direction, and the side wall 213 is located upward of the fixing member 211, the defibrated material is unlikely to stagnate in the vicinity of the inner surface 356 of the discharge path 310. In this case, the through-hole row 225 as a communication hole group does not need to be provided. In other words, the screen 221 has the through-hole row 224 as a communication hole group.

Figure 18:
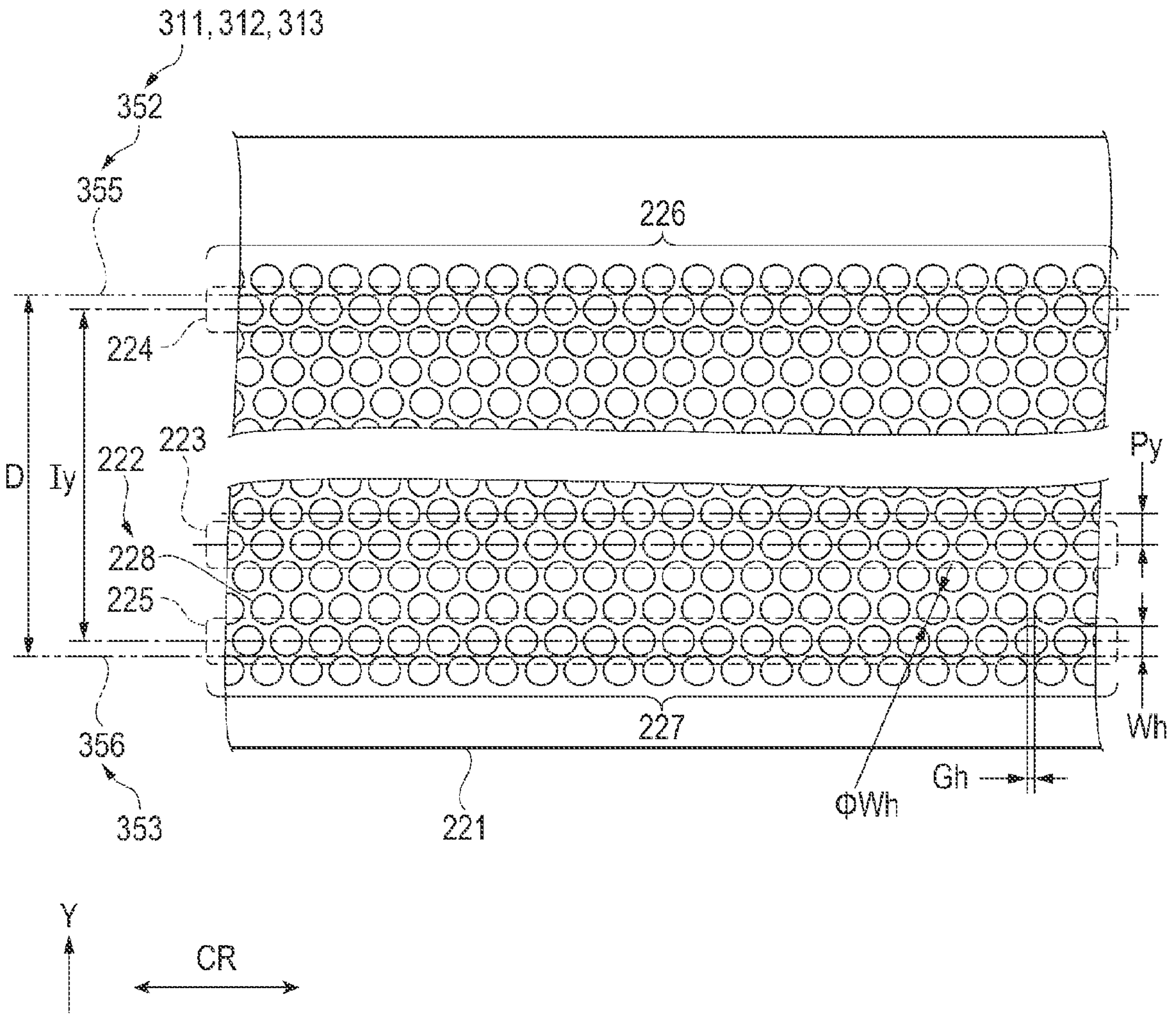
FIG. 18 is a partial development view illustrating another embodiment of the screen.

In the embodiment, the interval Gh between adjacent through-holes 222 may be smaller than the hole diameter Wh of the through-holes 222. For instance, as illustrated in FIG. 18, the through-holes 222 may be provided in the screen 221 to be displaced in the circumferential direction CR by half (Gh+Wh) as the center-to-center pitch with respect to other through-holes 222 included in adjacent through-hole row 224 in the Y-axis direction. In this case, at least part of the discharge path-side opening edge 228 of the through-holes 222 is overlapped in position with the discharge path-side opening edge 228 of other through-holes 222 that surround the through-holes 222 in one of the circumferential direction CR and the Y-axis direction. Accordingly, the opening rate can be increased relative to the opening rate in the embodiment while ensuring the interval between the through-holes 222. Alternatively, +Y direction side of the through-hole row 224 may be provided with a through-hole row 226 in which the discharge path-side opening edge 228 of the through-holes 222 is provided at a position overlapped with the inner surface 355 as seen in the radial direction RR. Alternatively, −Y direction side of the through-hole row 225 may be provided with a through-hole row 227 in which the discharge path-side opening edge 228 of the through-holes 222 is provided at a position overlapped with the inner surface 356 as seen in the radial direction RR. In this case, the through-hole row 226 and the through-hole row 227 are included in a plurality of through-hole rows 224. In this case, the through-hole rows 224, 226 are an example of one of the communication hole groups, and the through-hole rows 225, 227 are an example of the other of the communication hole groups.

Figure 19:
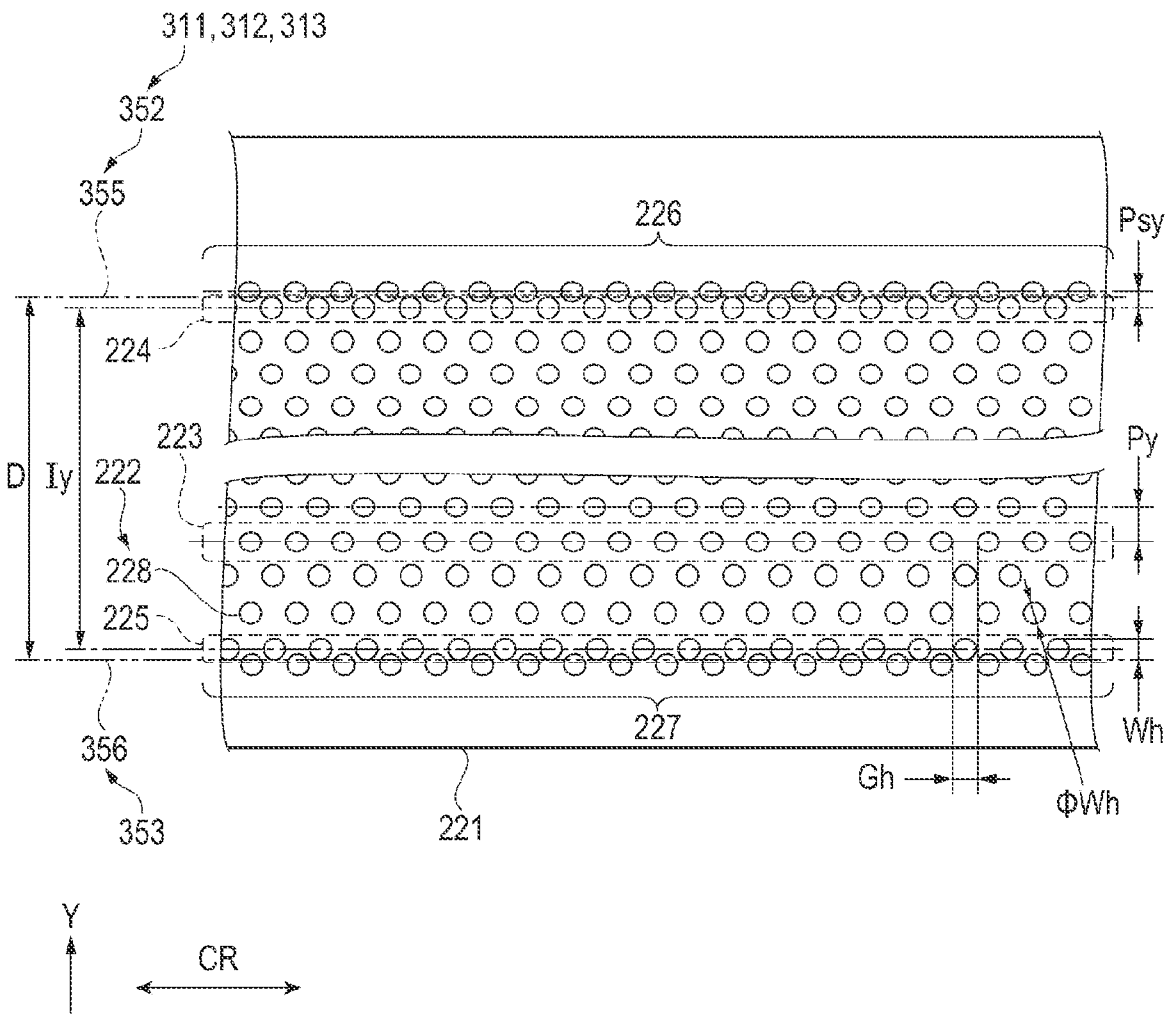
FIG. 19 is a partial development view illustrating another embodiment of the screen.

In the embodiment, the center-to-center pitch between the through-hole rows may not be the same. For instance, as illustrated in FIG. 19, +Y direction side of the through-hole row 224 may be provided with the through-hole row 226 in which the discharge path-side opening edge 228 of the through-holes 222 is provided at a position overlapped with the inner surface 355 as seen in the radial direction RR. Alternatively, −Y direction side of the through-hole row 225 may be provided with the through-hole row 227 in which the discharge path-side opening edge 228 of the through-holes 222 is provided at a position overlapped with the inner surface 356 as seen in the radial direction RR. In this case, the center-to-center pitch Psy between the through-hole row 224 and the through-hole row 226 and between the through-hole row 225 and the through-hole row 227 is smaller than the center-to-center pitch Py between through-hole rows 223. In this case, the through-hole rows 224, 226 are an example of one of the communication hole groups, and the through-hole rows 225, 227 are an example of the other of the communication hole groups.

Figure 20:
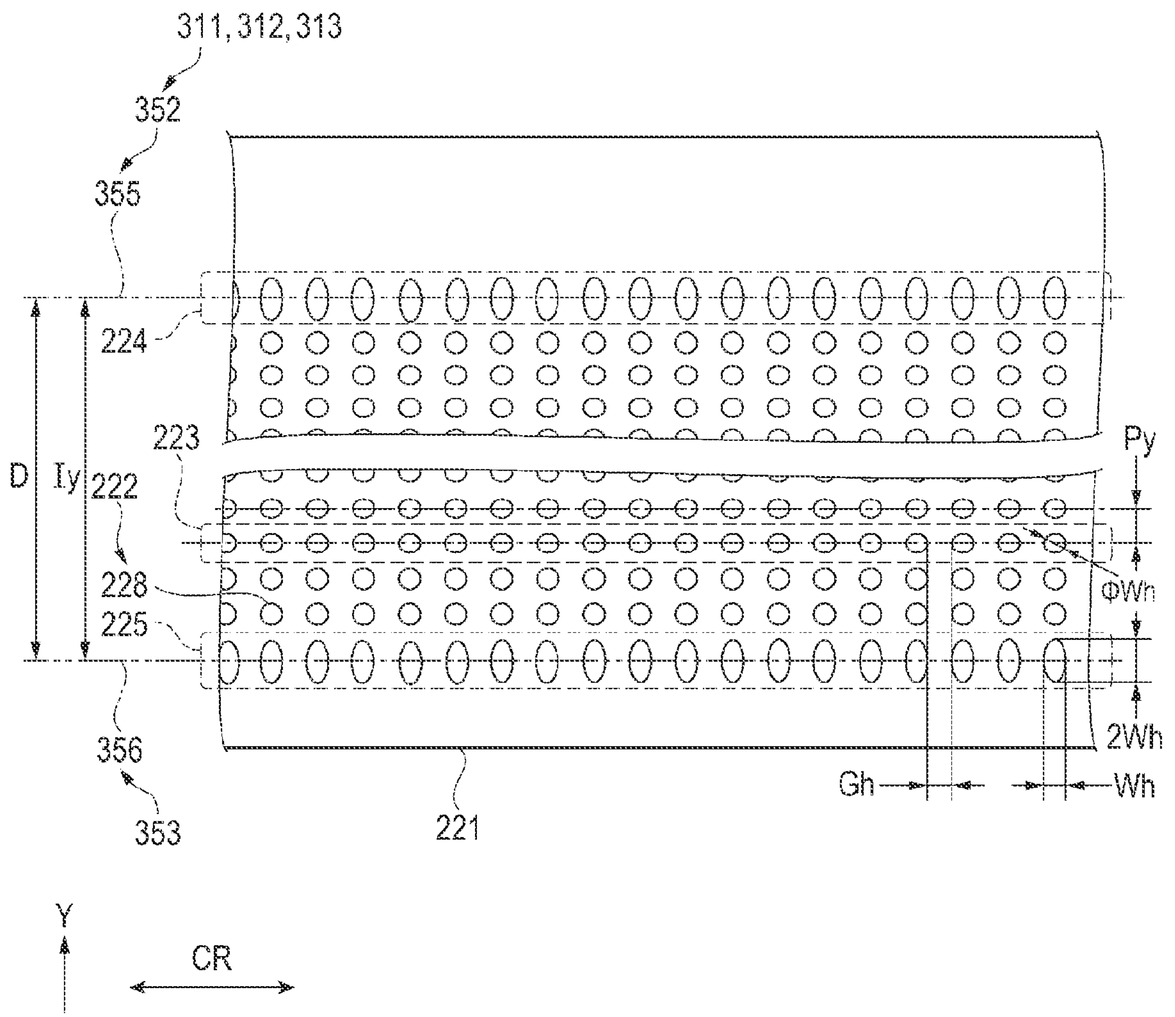
FIG. 20 is a partial development view illustrating another embodiment of the screen.

In the embodiment, the opening shape of each through-hole 222 does not need to be circular. For instance, the opening shape may be oval such as an ellipse and a long circle, and may be polygonal such as a triangle and a quadrilateral. For instance, as illustrated in FIG. 20, the plurality of through-holes 222 provided in the screen 221 may include through-hole 222 in different shapes. Note that in FIG. 20, the through-holes 222 included in the through-hole rows 224, 225 as communication hole groups have an oval shape with a width of Wh in the circumferential direction CR and a width of 2 Wh in the Y-axis direction. In this case, the center-to-center pitch Iy between the through-hole row 224 and the through-hole row 225 may be the same as the interval D between the side wall 352 and the side wall 353. In this case, the through-hole row 224 is an example of one of the communication hole groups, and the through-hole row 225 is an example of the other of the communication hole groups. Note that the through-holes 222 included in the through-hole rows 224, 225 illustrated in FIG. 20 may have an opening area smaller than that of the through-holes 222 included in the through-hole row 223. In this case, for instance, the through-holes 222 included in the through-hole rows 224, 225 may have an oval shape with a width of half Wh in the circumferential direction CR and a width of Wh in the Y-axis direction.

In the embodiment, the through-holes 222 may not be displaced in the circumferential direction CR with respect to other through-holes 222 included in adjacent through-hole row 224 in the Y-axis direction. In other words, a plurality of through-holes 222 may not be provided in the screen 221 in a staggered pattern. For instance, as illustrated in FIG. 20, the through-holes 222 may be provided in the screen 221 in a so-called lattice pattern, in which the through-holes 222 are disposed at the same position as the other through-holes 222 included in adjacent through-hole row 223 in the circumferential direction CR.

In the embodiment, when one through-hole row 224 is provided at a position where the discharge path-side opening edge 228 of the communication holes Ch is overlapped with one inner surface 355 as seen in the radial direction RR, and the other through-hole row 225 is provided at a position where the discharge path-side opening edge 228 of the communication holes Ch is overlapped with the other inner surface 356 as seen in the radial direction RR, the positions of the housings 311, 312, 313 may not be movable with respect to the screen 221 in the Y-axis direction with the screen 221 covered by the housings 311, 312, 313.

In the embodiment, the plurality of through-holes 222 have the same shape, and the screen 221 may be provided with the through-holes 222 so that the number of communication holes Ch provided per unit area in the screen 221 gradually increases as the distance from the discharge section 314 increases in the circumferential direction CR. In this case, for instance, through-hole rows each including the same number of through-holes 222 arranged in the Y-axis direction may be provided in the screen 221 so that the interval between through-hole rows decreases as the distance from the discharge section 314 increases in the circumferential direction CR. For instance, through-hole rows each including through-holes 222 arranged in the Y-axis direction may be provided in the screen 221 at the same intervals in the circumferential direction CR, and the number of through-holes included in each through-hole row may increase as the distance from the discharge section 314 increases in the circumferential direction CR. Thus, in the discharge path 310, a negative pressure due to the suction unit 35 is likely to be applied to the side away upstream from the discharge section 314. The speed difference between the flow speeds of air flows passing through the plurality of through-holes 222 provided in the screen 221 is likely to reduce. Thus, variation in defibration degree of the defibrated material discharged to the discharge path 310 can be reduced.

In the embodiment, the discharge section 314 does not need to be provided in the outer circumferential wall 351. For instance, the discharge section 314 may be provided in one of the side wall 353 and the side wall 352 of the housing 311. For instance, when the discharge section 314 is provided in the side wall 353, the discharge section 314 may be opposed to the screen 221, or may be opposed to the side wall 352 and may not be opposed to the screen 221. In this case, the blocking member 601 is provided in a region of the downstream-side screen 221D, the region not being opposed to the discharge section 314. That is, the blocking member 601 blocks the openings of the through-holes 222 by covering the downstream-side screen 221D. The blocking member 601 is provided in the outer circumferential surface, close to the discharge path 310, of the downstream-side screen 221D to block the openings, close to the outer circumferential surface, of the through-holes 222. Thus, communication between the defibrating chamber 210 and the discharge path 310 via the through-holes 222 can be blocked. Thus, it is possible to change the number of communication holes Ch provided in the downstream-side screen 221D to form a region with a smaller number of communication holes Ch in the downstream-side screen 221D. In this case, the plurality of through-holes 222 provided in the screen 221 do not need to have the same shape.

In the embodiment, the defibrating apparatus 200 may not be disposed in the sheet manufacturing apparatus 100 in a posture in which the axis AR is horizontal. In this case, the defibrating apparatus 200 may be disposed in the sheet manufacturing apparatus 100 in an inclined posture in which the axis AR intersects a horizontal direction under the condition that the discharge section 314 is located at the lowest position of the outer circumferential wall 351.

In the embodiment, the defibrating apparatus 200 may not be disposed in the sheet manufacturing apparatus 100 in a posture in which the discharge section 314 and the discharge pipe 30 are vertically downward from the axis AR. For instance, the defibrating apparatus 200 may be disposed in the sheet manufacturing apparatus 100 in a posture in which the discharge section 314 and the discharge pipe 30 are vertically upward from the axis AR. For instance, the defibrating apparatus 200 may be disposed in the sheet manufacturing apparatus 100 in a posture in which the discharge section 314 and the discharge pipe 30 are arranged side-by-side horizontally with the axis AR.

In the embodiment, the interval W between the outer circumferential wall 351 and the screen 221 may decrease stepwise as the distance from the discharge section 314 increases in the circumferential direction CR. For instance, in the discharge path 310, let width W1 be the width W of the region located in −Z direction from the axis AR, and let width W3 greater than the width W1 be the width W of the region located in +Z direction from the axis AR, then in the discharge path 310, the width W of the region connecting the region located in −Z direction from the axis AR and the region located in +Z direction from the axis AR may decrease stepwise as the distance from the region located in +Z direction from the axis AR increases toward the region located in −Z direction from the axis AR. Alternatively, in the discharge path 310, the width W of the region connecting the region located in −Z direction from the axis AR and the region located in +Z direction from the axis AR may be smaller than the width W3 and larger than the width W1.

In the embodiment, when the discharge path 310 is seen from −Y direction side as illustrated in FIG. 14, the discharge path 310 may have an asymmetric shape provided that in the discharge path 310, a clockwise air flow toward the discharge section 314 is generated in the region on +X direction side of the discharge section 314, and a counterclockwise air flow toward the discharge section 314 is generated in the region on −X direction side of the discharge section 314. In this case, for instance, the width W2 may be different from the width W4, and the region with the smallest width W may be displaced in the X-axis direction from the position in −Z direction from the axis AR. For instance, the interval D between the side wall 352 and the side wall 353 may differ between the region on +X direction side of the discharge section 314 and the region on −X direction side of the discharge section 314.

In the embodiment, a fixed blade may be provided in the region opposed to the rotary blades 503, in the inner circumferential surface of the screen 221. The fixed blade defibrates the raw material MA introduced between the rotary blades 503. In this case, the fixed blade may be fixed to the inner circumferential surface of the screen 221 with a clearance between the fixed blade and the tip ends of the rotary blades 503. As illustrated in FIG. 14, when the screen 221 is seen from −Y direction side, the fixed blade has a sharp shape projecting from the screen 221 to the rotary blades 503, and the shape may extend in the Y-axis direction. When a plurality of fixed blades are provided, they may be provided over the entire circumference of the screen 221 at intervals in the circumferential direction CR. Alternatively, the fixed blades may be provided in a region on the inner circumferential surface of the screen 221, the region being on the surface on the opposite side of the outer circumferential surface in which the blocking member 601 is provided.

In the embodiment, the supply unit 214 does not need to be circular as long as it is a through-hole that penetrates the side wall 212 in the Y-axis direction. For instance, the supply unit 214 may be polygonal or elliptic, or arc-shaped centered on the axis AR.

In the embodiment, the supply unit 214 does not need to be opened at a position vertically upward from the axis AR in the side wall 212. For instance, the supply unit 214 may be opened at a position located side-by-side horizontally with the axis AR in the side wall 212.

In the embodiment, the discharge section 314 may be circular as seen in the Z-axis direction. The dimension of the opening edge 315 in the Y-axis direction does not need to be the same as the inner dimension of the discharge path 310 in the Y-axis direction. In this case, for instance, the dimension of the opening edge 315 in the Y-axis direction may be smaller than the inner dimension of the discharge path 310 in the Y-axis direction.

In the embodiment, the dimension of the blocking member 601 in the Y-axis direction does not need to be the same as the dimension of the discharge path 310 in the Y-axis direction. For instance, the dimension of the blocking member 601 in the Y-axis direction may be smaller than the dimension of the discharge path 310 in the Y-axis direction. Alternatively, the dimension of the blocking member 601 in the X-axis direction may be the same as or smaller than the dimension of the opening edge 315 in the discharge section 314 in the X-axis direction. The blocking member 601 does not need to be rectangular. For instance, the blocking member 601 may be circular or oval.

In the embodiment, the defibrating apparatus 200 does not need to be provided with the blocking member 601. In this case, in the screen 221, the region RD may be provided with through-holes 222 so that the number of through-holes 222 provided per unit area in the region RD is less than the number in the region ERD. Alternatively, the inner circumferential surface of the screen 221 corresponding to the region RD may be provided with the above-described fixed blade so that the number of communication holes Ch in the region RD is less than the number in the region ERD. In this case, the fixed blade is provided in the inner circumferential surface, facing the defibrating chamber 210, of the screen 221, and may be regarded as an example of a blocking member that blocks the openings, close to the inner circumferential surface, of the through-holes 222.

In the embodiment, the housings 311, 312, 313 do not need to cover the outside of the screen 221 over the entire circumference in the circumferential direction CR. In addition, the discharge path 310 does not need to be provided outside of the screen 221 over the entire circumference in the circumferential direction CR. For instance, in the embodiment, the region between the outside of the screen 221 partially covered by the housing 311 and the outer circumferential wall 351 of the housing 311 may serves as the discharge path 310. In this case, in the screen 221, the region not covered by the housing 311 does not need to be provided with through-holes 222.

In the embodiment, the interval W between the outer circumferential wall 351 and the screen 221 may be constant in the circumferential direction CR of the screen 221. In this case, the flow path cross-sectional area of the discharge path 310 may be unchanged, and constant in the circumferential direction CR of the screen 221.

In the embodiment, the number of communication holes Ch in the same shape provided per unit area is made less in the downstream-side screen 221D than in the upstream-side screen 221U, thus when the downstream-side screen 221D and the upstream-side screen 221U with the same area are compared, air is more unlikely to pass through in the downstream-side screen 221D than in the upstream-side screen 221U. Alternatively, the shapes of the communication holes Ch may be made different between the downstream-side screen 221D and the upstream-side screen 221U so that air is more unlikely to pass through in the downstream-side screen 221D than in the upstream-side screen 221U. For instance, the hole diameter of the communication holes Ch provided in the downstream-side screen 221D may be made smaller than the hole diameter in the upstream-side screen 221U, thus when the downstream-side screen 221D and the upstream-side screen 221U with the same area are compared to each other, air is more unlikely to pass through in the downstream-side screen 221D than in the upstream-side screen 221U. In this case, the number of communication holes Ch provided per unit area in the downstream-side screen 221D may be the same as or less than the number in the upstream-side screen 221U.

What is claimed is:

1. A defibrating apparatus comprising:

a rotational body;

a plate shaped side wall to which the rotational body is rotatably coupled;

a defibrating chamber that is partially defined by the plate shaped side wall, in which the rotational body is stored, and in which a defibrated material is formed from a raw material containing fibers while the rotational body is rotated;

a circular annular wall fixed to the plate shaped side wall such that an interval is provided between the circular annular wall and the rotational body in a radial direction of the rotational body, the circular annular wall partially defining the defibrating chamber;

a discharge path arranged such that the circular annular wall is disposed between the discharge path and the defibrating chamber;

a plurality of through-holes provided in the circular annular wall, the discharge path communicating with the defibrating chamber via the plurality of through-holes, and receiving the defibrated material discharged from the defibrating chamber via the plurality of through-holes; and a housing that forms the discharge path, a side wall of the housing extending in a circumferential direction of the circular annular wall and having an inner surface that defines the discharge path, the side wall of the housing contacting the circular annular wall;

the discharge path having a width in an axial direction of the rotational body, and extends in the circumferential direction of the circular annular wall, when a communication hole is any of the through-holes which interconnect the defibrating chamber and the discharge path, and a discharge path-side opening edge is any of opening edges, closest to the discharge path, of a plurality of communication holes each of which is the communication hole, the circular annular wall having a communication hole group formed by a part of the plurality of communication holes, arranged at intervals in the circumferential direction, and the communication hole group being provided at a position where the discharge path-side opening edge is overlapped with the inner surface as seen in the radial direction.

2. The defibrating apparatus according to claim 1, wherein a pair of side walls of the housing, each of which is the side wall, is provided at an interval in the axial direction, and each of the side walls has the inner surface, a pair of communication hole groups, each of which is the communication hole group, is arranged in the circular annular wall, and one of the communication hole groups is provided at a position where the discharge path-side opening edge is overlapped with one of the inner surfaces as seen in the radial direction, and the other of the communication hole groups is provided at a position where the discharge path-side opening edge is overlapped with the other of the inner surfaces as seen in the radial direction.

3. The defibrating apparatus according to claim 1, wherein a dimension of the circular annular wall in the axial direction is greater a dimension of the width of the discharge path, and the housing forms the discharge path by covering an outside of the circular annular wall.

4. The defibrating apparatus according to claim 3, further comprising a fixing member that fixes the circular annular wall, wherein the housing is fixed to the fixing member with the circular annular wall interposed between the fixing member and the housing.

5. The defibrating apparatus according to claim 1, further comprising:

a discharge pipe that receives a negative pressure to discharge the defibrated material through the discharge path; and a discharge section that interconnects the discharge path and the discharge pipe, wherein the housing forms the discharge path in an annular shape by surrounding the outside of the circular annular wall in the circumferential direction, and has an outer circumferential wall provided at an interval from the circular annular wall in the radial direction, and the discharge section is provided in the outer circumferential wall, and opened toward the circular annular wall.

6. A fiber body manufacturing apparatus comprising:

the defibrating apparatus according to claim 1;

a web former that is arranged downstream relative to the defibrating apparatus in a transport direction of the defibrated material, and forms a web by accumulating the defibrated material discharged from the defibrating apparatus; and a fiber body former that is arranged downstream relative to the web former in a transport direction of the web, and forms a fiber body including the fibers by binding the fibers contained in the web.

* * * * *